(12) United States Patent
Brantner et al.

(10) Patent No.: US 10,951,712 B2
(45) Date of Patent: Mar. 16, 2021

(54) IOT COMMUNICATIONS BRIDGING POWER SWITCH

(71) Applicant: iDevices, LLC, Avon, CT (US)

(72) Inventors: Paul Brantner, Conifer, CO (US); Michael Tetreault, Simsbury, CT (US); Eric Ferguson, Simsbury, CT (US); David Davis, West Hartford, CT (US); Shawn Monteith, Burlington, CT (US); Michael Murray, Vernon, CT (US); Vladan Djakovic, San Francisco, CA (US)

(73) Assignee: iDevices, LLC, Avon, CT (US)

( * ) Notice: Subject to any disclaimer, the term of this patent is extended or adjusted under 35 U.S.C. 154(b) by 0 days.

(21) Appl. No.: 14/988,590

(22) Filed: Jan. 5, 2016

(65) Prior Publication Data

US 2016/0209899 A1 Jul. 21, 2016

Related U.S. Application Data

(60) Provisional application No. 62/100,000, filed on Jan. 5, 2015.

(51) Int. Cl.
*G06F 1/00* (2006.01)
*H04L 29/08* (2006.01)
(Continued)

(52) U.S. Cl.
CPC ............ *H04L 67/125* (2013.01); *H04L 12/12* (2013.01); *H04L 12/2823* (2013.01);
(Continued)

(58) Field of Classification Search
CPC ........ G06F 1/266; H04L 12/12; H04L 67/125
(Continued)

(56) References Cited

U.S. PATENT DOCUMENTS

| 3,421,085 A | 1/1969 | Erickson et al. |
| 5,914,845 A | 6/1999 | Chase |

(Continued)

FOREIGN PATENT DOCUMENTS

| JP | 2005235729 A | 9/2005 |
| JP | 2007519317 A | 7/2007 |

(Continued)

OTHER PUBLICATIONS

Edimax Networking People Together—Quick Installation Guide, 23 pages.

(Continued)

*Primary Examiner* — Volvick Derose
(74) *Attorney, Agent, or Firm* — Michael Best & Friedrich, LLP

(57) ABSTRACT

Power switching devices deliver power to at least one powered device and may command, control and/or monitor the powered device(s). The power switching devices may further bridge communications between remote devices, and for wireless devices uses wireless communication, such as, but not limited to, radio frequency (RF), Bluetooth, light, and sound frequencies, and Wi-Fi, wired and wireless internet, the cloud, and personal computing devices. Systems utilize such power switching devices for monitoring, command and/or control of the remote or powered devices, integration of information into data management applications, data storage, putting into place threshold alarms, monitoring available variables, functions and data, and associating events with time.

32 Claims, 12 Drawing Sheets

(51) Int. Cl.
*H04L 12/12* (2006.01)
*H04W 4/80* (2018.01)
*H04L 12/24* (2006.01)
*H04L 12/28* (2006.01)
*G06F 1/3203* (2019.01)

(52) U.S. Cl.
CPC .............. *H04L 41/04* (2013.01); *H04W 4/80* (2018.02); *G06F 1/3203* (2013.01); *H04L 2012/2841* (2013.01)

(58) Field of Classification Search
USPC ........................................................ 713/310
See application file for complete search history.

(56) References Cited

U.S. PATENT DOCUMENTS

| | | | | |
|---|---|---|---|---|
| 7,435,091 | B1* | 10/2008 | Cruz | H01R 31/06 439/18 |
| 7,611,253 | B2* | 11/2009 | Chien | H02J 7/00 362/84 |
| 7,845,951 | B1 | 12/2010 | Goon | |
| 8,931,400 | B1 | 1/2015 | Allen | |
| 9,013,283 | B1* | 4/2015 | Tackaberry | G06Q 10/08 340/12.22 |
| 2005/0136972 | A1* | 6/2005 | Smith | H04B 3/542 455/554.1 |
| 2006/0148403 | A1* | 7/2006 | Martin | H04B 3/54 455/41.1 |
| 2006/0161270 | A1* | 7/2006 | Luskin | G05B 15/02 700/22 |
| 2007/0197262 | A1* | 8/2007 | Smith | H04L 12/2803 455/562.1 |
| 2009/0023304 | A1* | 1/2009 | Gerard | H01R 35/02 439/13 |
| 2009/0207034 | A1 | 8/2009 | Tinaphong et al. | |
| 2010/0044195 | A1* | 2/2010 | Chiang | G06F 1/266 200/175 |
| 2010/0060187 | A1 | 3/2010 | Newman, Jr. et al. | |
| 2010/0290390 | A1 | 11/2010 | Souissi et al. | |
| 2011/0320636 | A1* | 12/2011 | Young | H04W 88/16 709/249 |
| 2012/0049639 | A1* | 3/2012 | Besore | H02J 3/14 307/97 |
| 2012/0060044 | A1* | 3/2012 | Jonsson | G01D 4/002 713/340 |
| 2013/0069617 | A1* | 3/2013 | Lee | H01R 31/065 323/318 |
| 2013/0234534 | A1* | 9/2013 | Lin | H02J 13/0075 307/112 |
| 2013/0261821 | A1* | 10/2013 | Lu | H04L 12/2807 700/289 |
| 2013/0338844 | A1 | 12/2013 | Chan et al. | |
| 2013/0339766 | A1* | 12/2013 | Chen | G06F 1/266 713/300 |
| 2014/0028210 | A1* | 1/2014 | Maxik | F21V 23/06 315/200 R |
| 2014/0070959 | A1* | 3/2014 | Bhargava | H04M 1/72533 340/870.07 |
| 2014/0163751 | A1* | 6/2014 | Davis | H04L 12/12 700/286 |
| 2014/0226851 | A1* | 8/2014 | Alberth, Jr. | G06Q 50/06 382/103 |
| 2014/0244040 | A1* | 8/2014 | Alberth, Jr. | H04L 12/2803 700/275 |
| 2014/0266669 | A1* | 9/2014 | Fadell | G05B 19/042 340/501 |
| 2014/0308844 | A1 | 10/2014 | Beharrell | |
| 2014/0310744 | A1* | 10/2014 | Gelonese | H04N 21/4126 725/34 |
| 2014/0325245 | A1* | 10/2014 | Santini | G06F 1/266 713/300 |
| 2015/0077021 | A1* | 3/2015 | Smith | F21V 23/0435 315/362 |
| 2016/0040903 | A1 | 2/2016 | Emmons et al. | |
| 2016/0041573 | A1* | 2/2016 | Chen | G05F 1/66 700/295 |
| 2016/0105735 | A1* | 4/2016 | Louzir | G01D 4/00 340/870.02 |
| 2016/0150057 | A1* | 5/2016 | Men | H04W 4/70 709/230 |
| 2016/0165660 | A1* | 6/2016 | Delamare | H04B 5/0056 455/41.1 |
| 2016/0190748 | A1* | 6/2016 | Emby | H01R 25/003 340/654 |
| 2016/0239033 | A1* | 8/2016 | Pan | G05B 15/02 |

FOREIGN PATENT DOCUMENTS

| | | |
|---|---|---|
| JP | 2013004394 A | 1/2013 |
| WO | 2005057834 A1 | 6/2005 |

OTHER PUBLICATIONS

International Search Report for International Application No. PCT/US 16/12229 dated Mar. 28, 2016, 3 pages.
Written Opinion for International Application No. PCT/US 16/12229 dated Mar. 28, 2016, 11 pages.
Extended European Search Report for corresponding European Application No. 16735319.2, dated May 28, 2018—7 pages.

* cited by examiner

IOT COMMUNICATIONS BRIDGING POWER SWITCH

CROSS-REFERENCE TO RELATED APPLICATIONS

This application claims benefit under 35 U.S.C. § 119(e) to U.S. Provisional Patent Application No. 62/100,000, filed Jan. 5, 2015, which is incorporated herein by reference in its entirety and made a part hereof.

FIELD OF THE DISCLOSURE

The present disclosure relates generally to remote communication with electronic devices. More specifically, the present disclosure relates to power switches that are equipped with modules for multiple modes of remote communication and are thereby capable of serving as a bridge between connected electronic devices. In addition, the present disclosure relates to methods of remote communication with electronic devices using a power switch equipped with multiple modes of remote communication.

BACKGROUND INFORMATION

Internet of Things (IoT) technology has led to a plethora of computing devices to remotely automate, control, and monitor powered devices. There are many types of data communication, frequencies of communication, and protocols available and in use for remotely communicating between computing devices and powered devices. Often, these types of communication are not readily adaptable to each other or a common user interface. This can limit the ability of devices to communicate with each other.

Furthermore, in a system with multiple wireless-enabled devices, each wireless device must separately communicate with the wireless network, such as a router. This requires that each device be in range of the wireless communication device, e.g., the router. This may require limitations on where the devices may be placed, where the router may be placed, or require multiple routers or other wireless access points.

In addition, this proximity requirement may limit the type of wireless communication available for connecting between the device and the wireless network. Different types of wireless communication technologies have different ranges. For example, Wi-Fi may have a range of a couple of hundred feet. However, Wi-Fi may require an undesirable power requirement. This may be an issue where the wireless device is not permanently connected to a power source and is powered by a battery, either disposable or rechargeable. Bluetooth technologies such as Bluetooth Low Energy (BLE) have reduced energy requirements compared to other communication technologies, and thus may be desirable for devices that are powered by batteries. However, Bluetooth technology has a limited range that renders it unsuitable for longer distance communication. Thus, Bluetooth protocol may be desired for the particular application, but it may not be practical due to the range limitations. Also, in certain systems, data or information from a first wireless device is used to control the operation of a second wireless device. This requires that both devices be connected to a wireless network. As discussed above, this requires that both devices be in range of a wireless network, and that both devices have sufficient power to operate on that network.

One category of remote communication device is termed a "smartplug." Generally speaking, a smartplug is a power outlet connected to power line, e.g., a wall electrical outlet, that has a wireless radio for communication with a remote device. The remote device may be used to control the power state of the smartplug, that is, on or off, to control power delivery to the devices plugged into the smartplug. In some instances, the smartplug can relay information to the remote device, e.g., the power usage of the device(s) plugged into smartplug, as measured by a power meter incorporated into the smartplug.

SUMMARY OF THE INVENTION

In view of the above, the inventors have determined that it would be advantageous to have a power switching device configured to deliver power to at least one powered device and configured to provide a communications bridge between a computing device and a remote device.

Accordingly, the present disclosure includes devices, systems and methods for providing a common communication access point to bridge between one or more remote devices, integrated with a power switch for control of connected electrical loads. The systems may interface with, connect to, be part of or include a Internet of Things (IoT) network and user interface. Through the IoT network and user interface, a user can control, monitor, or program automated control and monitoring of, the one or more remote devices. As used in this specification, the "Internet of Things" refers to a network of physical objects embedded with electronics, software, sensors, and network connectivity, which enables these objects to collect and exchange data. Upon receiving information or data from one or more of the remote devices, the IoT network may control or actuate other devices connected to the IoT network.

In one aspect, the system includes an integrated power switching device that is adapted to command, control, and/or monitor e.g., power usage and/or other attributes, characteristics or functioning, of one or more devices that are electrically connected to the power switching device, such as via a power cord connected to the power switching device. In some embodiments, the power switching device is embodied in a housing equipped with a power plug that can be plugged into a wall. In other embodiments, the power switching device is built into an electrical outlet within a wall. In yet other embodiments, it is built into an adapter that can screw into a light bulb socket.

The power switching device is also equipped with a communications module configured to bridge communications between at least one remote wireless device and a computing or "smart" device. The system may further be adapted to permit a user to command and control the at least one wireless device, integrate information into data management applications, and store data. Advantageously, the system can thus store data relevant to devices for which where data storage capability is or was not available on board the device to be commanded or controlled. The system may also be programmed to analyze or integrate stored data, and to provide a user interface for accessing this data. In some embodiments, this user interface can be a graphical user interface. The system may further be programmed to track activity of a device connected with the system, to notify of the existence of an alarm condition generated by or associated with a connected device, to monitor variables associated with device performance, or to associate events with time.

The power switching device may be wirelessly connectable to one or more remote wireless devices by any type of wireless communication technologies or protocols.

Examples include, but are not limited to, radio frequency (RF), Bluetooth, Bluetooth Low Energy (BLE), Wi-Fi, light (including but not limited to infrared and visible light), 802.11 frequency, ultrasound frequency, Zigbee™ frequency, ISM Band radio frequency such as, but not limited to 420 Mhz to 450 Mhz and 902 Mhz to 928 Mhz, and GSM Band radio frequency such as, but not limited to GSM-450 and GSM-900. The power switching device may, alternatively or in addition, also be connectable to a remote device by a wire or cable, such as a USB connection. Those of ordinary skill in the art should recognize that the above examples are not limiting, and the switching device may be connected or connectable to remote devices by any manner and/or using any communication scheme or protocol currently known or later becomes known.

Similarly, the power switching device may be connectable to one or more computing or smart devices or an Internet of Things (IoT) by any type of communication technologies or protocols, whether currently known to those of ordinary skill in the art or later developed. Examples of wireless connections include, but are not limited to, WiFi, Bluetooth, Bluetooth Low Energy (BLE), radio frequency (RF), light (including but not limited to infrared and visible light), 802.11 frequency, ultrasound frequency, Zigbee™ frequency, ISM Band radio frequency such as, but not limited to 420 Mhz to 450 Mhz and 902 Mhz to 928 Mhz, and GSM Band radio frequency such as, but not limited to GSM-450 and GSM-900, the internet, and the cloud. In other embodiments, the power switching device may be connected to a computing device by a wire or cable, such as an Ethernet cable, LAN, or other manner currently known or later becomes known.

In some embodiments, the system enables remote monitoring or control of a powered device that is plugged into the power switching device. In some such embodiments, the powered device need not include a remote communications module, and a user can remotely monitor or controls the powered device via the communications bridge of the power switching device.

In some embodiments, the system may enable remote storage of data associated with the powered device. In some such embodiments, the powered device itself may lack memory for storage of data. The data may reside or be stored in on-board memory within the power switching device. In addition, the data may reside or be stored in other devices connected to the power switching device, including a computing device, or any device remotely connected to the computing device. In some such embodiments, data storage and monitoring applications can be stored within on-board memory of the power switching device or other devices connected to the power switching device.

In some embodiments, control applications can control the operation of the power switching device, the powered device(s), and/or the remote device(s). In some such embodiments, the control applications can reside or be stored in memory on board the switch, on computing devices remotely connected to the power switching device, or on any device remotely connected to the computing device.

In some such embodiments, the system includes programs that may identify and alert programmable alarm state conditions and warnings in connection with the powered and/or remote device(s). For example, the power switching device may issue an alarm upon detecting that electrical current has stopped flowing to a powered device. In some such embodiments, the programs that identify and alert alarm state conditions and warnings reside or be stored in memory on board the switch, on computing devices remotely connected to the power switching device, or on any device remotely connected to the computing device.

In some embodiments, the system comprises firmware (i.e., embedded code on a microcontroller) that allows cohesive communications between two or more remote devices, or between the power switching device and one or more remote devices. "Cohesive communications" as used herein refers to communications that are direct, unified and seamless. The system may enable a plurality of such cohesive communications between multiple devices. The remote devices may use the same, or different, communications protocols. For example, the firmware may enable communication between two different Bluetooth-enabled devices that cohesively communicate with each other using the power switching device as a communications bridge. Alternatively, for example, the firmware may enable communication between the power switching device and a computer using Wi-Fi, and between the power switching device and a smart appliance using Bluetooth or Bluetooth Low Energy.

The applications and firmware for each of the above-mentioned functions may be stored on any device within the IoT network, including but not limited to the power switching device, the remote device, or the computing device.

One advantage of the invention is that it permits a reduced number of devices that need to be connected to the wireless network and remote computing units.

Another advantage of the invention is that it permits devices in connection with the wireless network and thus remote computing units to be in communication with other wireless devices via a bridging function. Accordingly, the other wireless devices do not need to be in communication directly with the wireless network, increasing the flexibility of their placement, usage, power source, and power consumption.

Yet another advantage of the invention is that it allows a power switch to control power delivery to a device electrically connected to the switch based on information from, data from, or a condition of, another device wirelessly connected to the power switch, without the wireless device being directly connected to the network.

Other objects and advantages of the present invention will become apparent in view of the following detailed description of the embodiments and the accompanying drawings.

DETAILED DESCRIPTION OF EMBODIMENTS OF THE INVENTION

Figure 1:
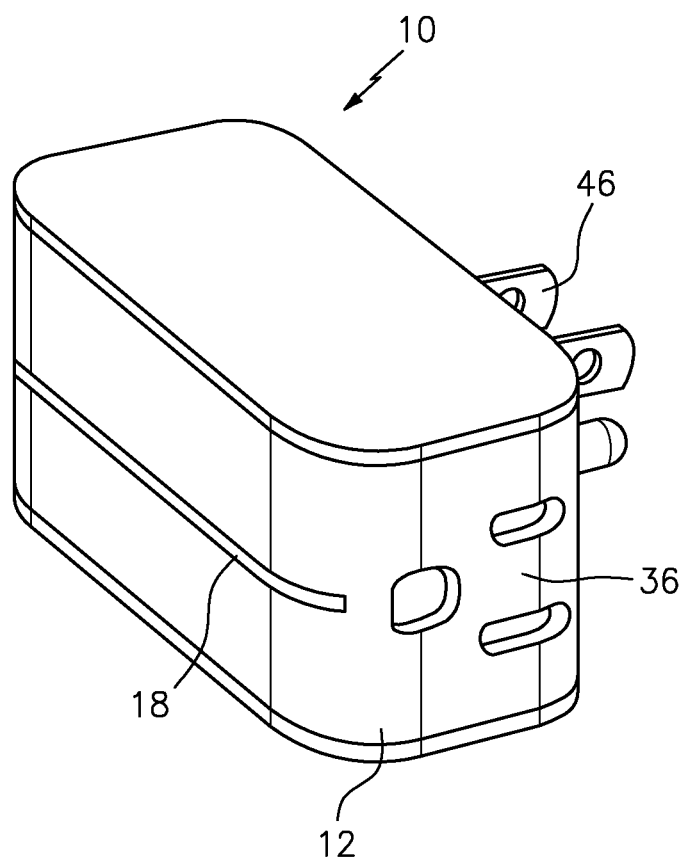
FIG. 1 is a top perspective view of an embodiment of a power switching device.
Figure 2:
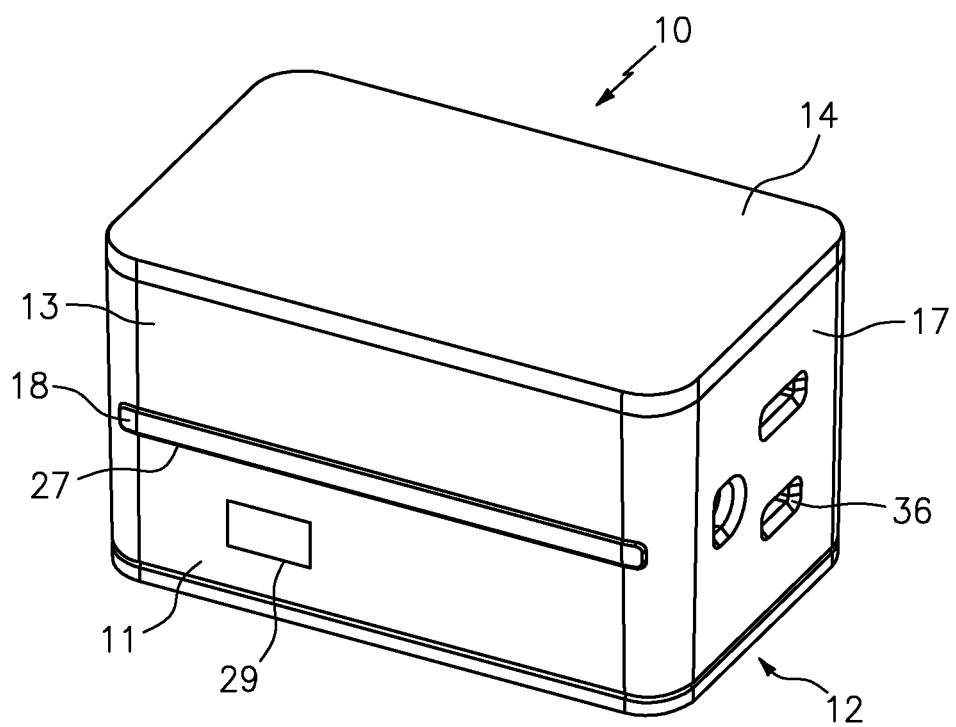
FIG. 2 is a front perspective view of the power switching device of FIG. 1.

FIGS. 1 and 2 show an embodiment of power switching device 10. Switching device 10 has a housing or enclosure 12 enclosing the internal components of the power switching device 10, a status indicator 18, a power receptacle 36, and a power connector 46.

Referring to FIG. 2, the embodiment of FIG. 1 is shown in further detail. The power switching device 10 is encased by a housing 12, which includes a casing 11 substantially laterally surrounding the internal components of the plug and to which is attached, e.g., snap fit into, a top cover 14 and a bottom cover 16. In the embodiment shown, casing 11, top cover 14, and bottom cover 16 form a substantially brick-like shape. The longest axis of the substantially brick-like shape is oriented in a horizontal direction when the plug is inserted into a typically oriented electrical socket in the United States. This orientation is advantageous in that it enables the power switching device 10 to fit compactly within the vertical space corresponding to a single electrical outlet within a standard North American faceplate. Thus, more than one power switching device 10 may be plugged into a faceplate with multiple outlets, in a configuration resembling a stack. However, the power switching device 10 may take any geometric shape suitable for containing the elements and effecting the functions described herein, for any electrical outlet configuration that is used worldwide.

Power connector 46 is in electrical connection with internal components of the switching device 10. Power connector 46 is configured to be placed into electrical communication with a power source (not shown). In the illustrated embodiment, the power connector 46 is in the form of a male, three-pronged plug commonly used in the United States, adapted to be inserted into an electric receptacle or outlet, such as a wall outlet. However, those of ordinary skill in the art should understand that the power connector 46 can be of any form or configuration suitable for delivering electric power from a power source to the electrical components of the switching device 10, either currently known or later developed. For example and without limitation, the power connector 46 may be a female power receptacle adapted to receive a male plug from a power source. As another example, the power connector 46 may be a USB port adapted to receive electrical power, e.g., from a USB prong connected to an electrical source. Conversely, the power connector 46 may be a USB prong adapted to connect to a USB port that is in connection with a power source.

The power connector 46 may be configured to receive and deliver any form of electrical energy known to those of skill in the art, including AC current, DC current, or both. In some embodiments, the input may use a standard phase/neutral/ground 110V wiring. The power switching device may also use a standard 115V/15A, NEMA 5-15 style, a standard 115V/20A, NEMA 5-20 style, a standard phase/neutral/ground 110V wiring plug or receptacle, a standard 220V single phase plug or receptacle, a standard phase/neutral/ground 220V wiring, a standard phase/neutral/ground 127V wiring, a standard phase/neutral/ground 230V wiring, a standard phase/neutral/ground 230V wiring, a standard phase/neutral/ground 240V wiring, or a relay or contactor.

Power receptacle 36 is configured to receive an electrical connection from an electrically powered device (not shown) to selectively deliver power to that device. In the illustrated embodiment, the power receptacle 36 is in the form of a female plug receptacle commonly used in the United States, such as on an electrical wall socket or the end of a power cord. Accordingly, receptacle 36 can receive the male prong commonly found on the end of the power cord of electric devices in the United States. Those of ordinary skill in the art should understand, though, that the power receptacle 36 can be of any form or configuration suitable for delivering electric power to a powered device, either currently known or later developed. In alternative embodiments, the power receptacle 36 may be a USB port adapted to provide electrical power, as is known. In addition, power switching device 10 may contain one or more USB ports, which may be distinct from power receptacle 36 or power connector 46, that may be utilized to power, control, monitor, or transfer data to attached USB devices, as will be described further herein. This USB port may be accessed through any suitable location along an exterior of housing 12. For example, in the illustrated embodiment, USB port 29 may be accessed through front face 13 of casing 11.

Power receptacle 36 can be selectively placed into electrical communication with power connector 46 such that when electrical power is connected to the power connector 46, power can be selectively delivered to the powered device. The selective power delivery between the power connector 46 and the power receptacle 36 may be controlled by an internal power switch (not shown in FIG. 2) that selectively places the power connector 46 and the power receptacle 36 into electrical communication with each other.

The delivery of power from the power connector 46 to the power receptacle 36 can utilize any mechanism known to those of skill in the art. In some embodiments, the power receptacle 36 may use a silicon controlled rectifier (SCR) or a triode for alternating current (TRIAC) for the output. The power switching device may also use a PWM controlled transformer, a flyback controlled transformer, a flyback controlled inductor for dimming, or motor speed control for either AC or DC power output. The power switching device 10 may also use a step down transformer, a flyback controlled inductor, a half wave rectifier and capacitive voltage divider, or a half wave rectifier to connect the load to AC power for either AC or rectified DC power output.

In the illustrated embodiment, only one power receptacle 36 is included. However, it should be understood that any number of power receptacles may be provided, or no power receptacles at all. In embodiments having more than one power receptacle, the receptacles may be of the same type, e.g., all female plug receptacles or all USB power ports, or of different types in any suitable combination. Further, the multiple power receptacles all may be controlled together by one power switch or controlled separately by multiple power switches, each controlling electrical delivery to one or more power receptacles. In some embodiments, the switch(es) has a separate TRIAC for delivery of power to each power receptacle. For example, a switch for power control of two power receptacles would have two TRIACs, each controlling delivery of power to a separate power receptacle.

A front face 13 of casing 11 contains an opening 27 through which status indicator 18 is located or otherwise visible. In the embodiment shown, status indicator 18 is oriented at approximately the mid-level of the casing 11. However, status indicator 18 may also be oriented at various heights above and below the mid-level of casing 11, so long as the placement of the light bar does not interfere with the placement of other internal components of power switching device 10. In the embodiment shown, status indicator 18 extends across substantially the entire length of casing 11. Advantageously, this configuration maximizes the light emitted from the power switching device and also indicates the full profile of the power switching device in a dimly lit room. In other embodiments, however, the status indicator may occupy only a portion of the width of the power plug. Moreover, although in the present embodiment status indicator 18 is presented in the form of a continuous bar, status indicator 18 may take any other form suitable for emission of light out of housing 12. Such suitable forms include, but are not limited to, a row of circular points or a row of slit-like points.

Status indicator 18 may display light from one or more internal lighting elements (not shown) located within housing 12. The lighting elements may be turned on and off, and the light displayed through the lighting elements may be adjusted in brightness or color, in accordance with the desire of a particular user, in a manner as would be understood by those of ordinary skill in the art. The lighting elements may in some embodiments be controlled wirelessly using a remote device (not shown in FIG. 1 or 2) such as a smart phone. In some instances, the remote device may include a computer program, e.g., an application, for interface between the user of the remote device and the power switching device 10, that is configured to control the brightness and color of the lighting devices. One exemplary application is the HomeKit® application marketed by Apple, Inc.

Status indicator 18 may indicate a status of the power switching device 10. In the embodiment shown, the status indicator 18 is a light. When the status indicator 18 is lit and/or unlit, it indicates a status of the power switching device 10. By way of example only, when the status indicator 18 is lit, it can indicate that the power switching device 10 is receiving electrical power through connector 46, e.g. is "on." When the status indicator 18 is unlit, it can indicate that the power switching device 10 is not receiving electrical power through plug 46, e.g., is "off." As another example, a lit status indicator 18 can indicate that the power receptacle 36 is provided with electric power, and unlit indicates the power receptacle 36 is not provided with electrical power. As yet another example, the lit/unlit status of the status indicator 18 can indicate whether the switching device 10 is wirelessly connected to the network via a remote computing unit.

The status indicator 18 can be configured in certain embodiments to indicate multiple statuses. In some embodiments, this is achieved by different patterns or lighting. For example, in one embodiment, a continuously lit status indicator 18 indicates that electric power is being delivered to the power switching device 10. In another embodiment, a continuously lit status indicator 18 indicates that power is being delivered to the power receptacle 36. In some embodiments, when the switching device 10 becomes wirelessly connected to a network or remote computing device, the status indicator 18 will blink or repeat an on/off pattern.

In yet other embodiments, the status indicator 18 is configured to display multiple colors, with different colors indicating different statuses. For example, a green color could indicate that power is being delivered to the power switching device 10, or alternatively, to the power receptacle 36, and a blue color could indicate that the switching device 10 is wirelessly connected. In yet further embodiments, the status indicator 18 displays combinations of different colors and lighting patterns to indicate a particular status or statuses, as should be understood by those of ordinary skill in the art.

In some embodiments, the status indicator 18 utilizes a one or more light emitting diodes (LED). Different LEDs may be different colors. In some embodiments, the LED(s) is a multicolor LED. In some such embodiments, the LED comprises three or more colors, or as many colors as desired. In addition, the LED may be programmable and dimmable, in a manner as should be understood by those of ordinary skill in the art. In some embodiments, the status indicator 18 may function as a "night light" so as to provide light in a dimly lit or dark room. It should be understood by those of ordinary skill in the art that the above-described embodiments are merely exemplary, and the status indicator 18 may take any form, and utilize any methods, either currently known or later developed, to indicate desired status or statuses.

Still referring to FIG. 2, side face 17 of casing 11 contains power receptacle 36, which in the embodiment of FIG. 2 takes the form of a female power socket. Power receptacle 36 is oriented at a right angle to light bar 18, e.g., on a side face of the casing 11. Advantageously, this power receptacle 36 is thus placed in a location in which it does not block or disrupt the appearance of light bar 18. In addition, placement of power receptacle 36 on a side facing 17 of the housing 12 minimizes the overall profile of power switching device 10 in use. Because power receptacle 36 is side facing, when a power cord is inserted into the power receptacle 36, the power cord does not increase the power switching device's overall extension from the wall. Power receptacle 36 is configured to receive a plug for a power cord that may transmit power to any suitable electrically powered device, machine, or appliance. Exemplary devices include, but are not limited to an air conditioner, light, refrigerator, freezer, washing machine, dryer, induction stove, humidifier, fan, computer, television, vacuum cleaner, or garage door opener. In the embodiment shown, power receptacle 36 is configured to receive plugs arranged in a standard North American configuration. However, power receptacle 36 can be configured to receive a plug from any configuration of electrical plugs known or that may later become known.

Figure 3:
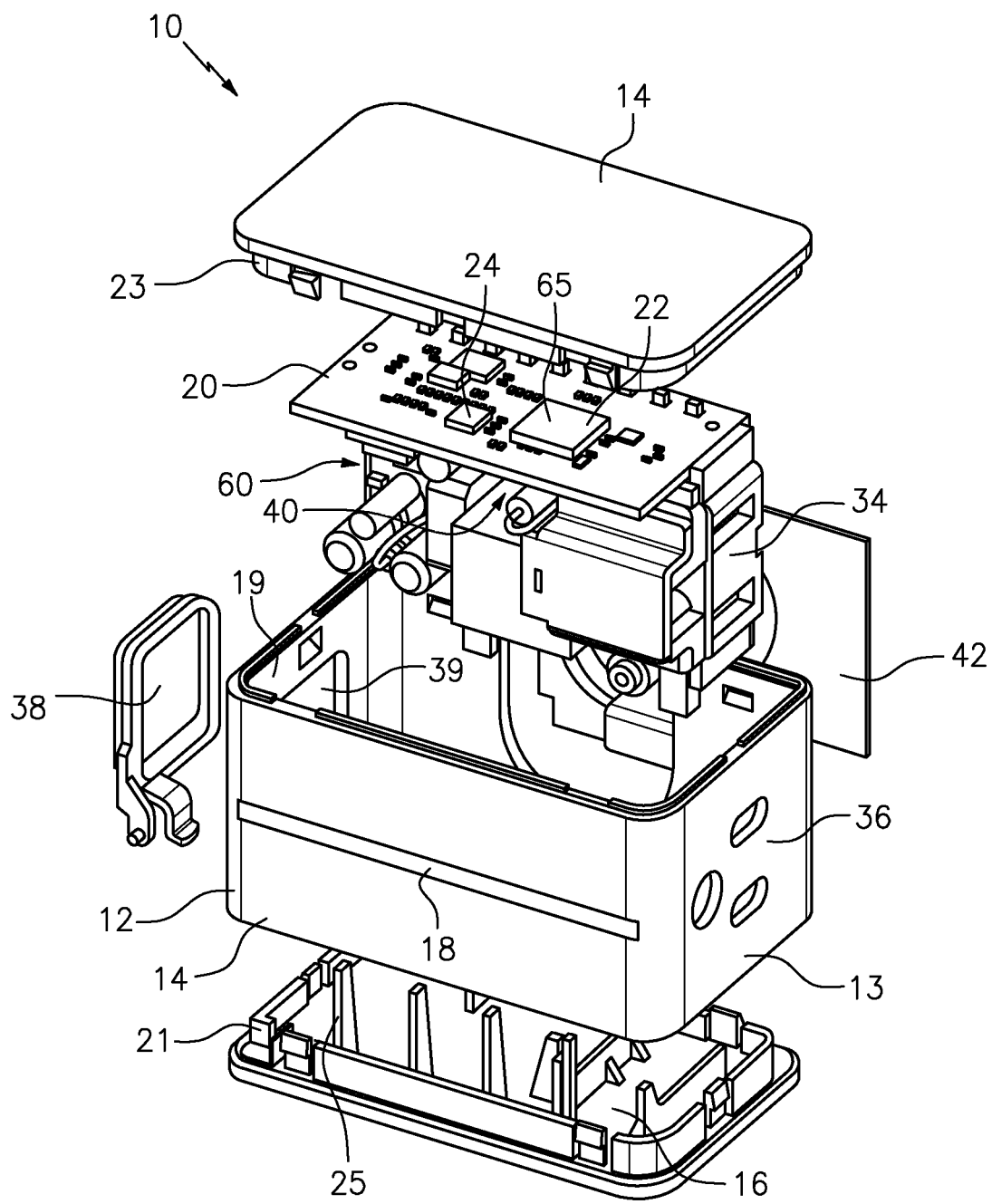
FIG. 3 is an exploded front perspective view of the power switching device of FIG. 1 showing the internal components thereof.
Figure 4:
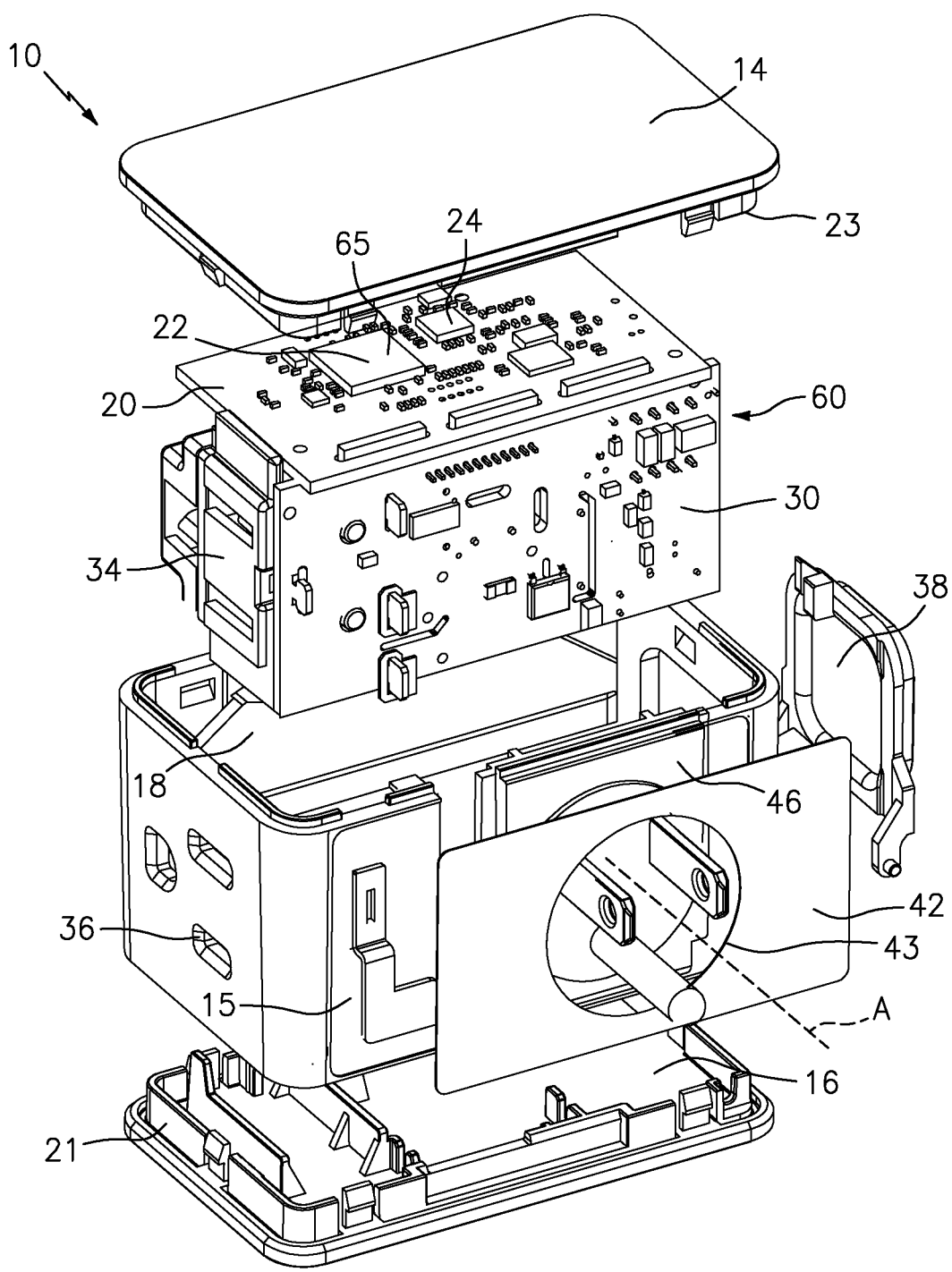
FIG. 4 is an exploded rear perspective view of the power switching device of FIG. 1.

FIGS. 3 and 4 each display an exploded view of the power switching device 10, for viewing internal components of the power switching device 10. Side face 19 of casing 11 contains an opening 39 into which button 38 is inserted. Button 38 is operatively connected to an electrical switch (not shown) on power board 30. The button can thereby function as an external power switch that is accessible from an exterior or the housing 12 and enables manual connection or disconnection of power connector 46 and power receptacle 36. The switch in some embodiments is a relay-type switch configured to control electrical power to the power receptacle 36, i.e., to a power cord that is plugged into power receptacle 36. However, the switch may be any suitable type of switch as would be understood by those of ordinary skill in the art. For example, the switch may be a mechanical switch, e.g. a pull switch, rotary switch, or a toggle switch; an electronic switch, e.g., a solenoid switch; or any suitable switch to permit a user to control the power connection between the connector 46 and the receptacle 36. The button in some embodiments alternatively or additionally controls power to any or all of the specific modules contained within the power switching device 10, such as wireless communication module 20. In addition to being controlled by the button 38, the switch may be configured to be controlled in response to wirelessly communicated commands, as further discussed below.

Referring to bottom cover 16 and top cover 14, protrusions 21 are attached to bottom cover 16 and the bottom portion of casing 11 has complimentary structure, so as to enable a snap-fit connection between bottom cover 16 and casing 11 in a known manner. Protrusions 23 are attached to top cover 14 and the top portion of casing 11 has structure complimentary structure thereto to enable snap-fit connection of these parts. While the embodiment displayed in FIGS. 3 and 4 is held together via snap fitting, the bottom cover 16, top cover 14, and casing 11 can be attached to each other through any suitable mechanism known to those in the art, including but not limited to adhesives, fasteners, screws, nails, or brackets. Bottom cover 16 also has a plurality of long protrusions 25. The long protrusions provide support for light bar 18 and prevent it from being dislodged from the opening 27.

Power connector 46 extends through an opening 43 in rear face 15. Power connector 46 is electrically attached to power board 30 in any manner as would be understood by those of skill in the art, including, for example only, beryllium copper spring clips. Power connector 46 may alternatively be attached to the housing in a fashion as would be understood by those of ordinary skill in the art that enables the housing to rotate around axis "A." This advantageously allows a user to rotate the power switching device 10 into an orientation that is desired by or convenient for the user.

A label 42 may be affixed to rear face 15 through any suitable mechanism, as would be understood by those of ordinary skill in the art, e.g., adhesive. The label may contain printed information, such as, for example, information required to be displayed by regulatory authorities, directions for operation of the power switching device 10, etc. In the embodiment shown, the label 42 contains a hole 43 through which the prongs of power connector 46 may extend unimpeded. Advantageously, when the label 43 is thus affixed to the rear face 15, it does not interfere with the visual impression on the user when the power switching device 10 is plugged into an outlet. However, specification label may also be affixed to any other suitable surface of the casing 11, bottom cover 16, or top cover 14.

Still referring to FIGS. 3 and 4, internal module 60 is enclosed within housing 12 of power switching device 10. Internal module 60 comprises three printed circuit boards: wireless communication board 20, AC power board 30, and power meter board 40.

Wireless communication board 20 includes at least two modules for wireless communication. In some embodiments, one of the modules for wireless communication operates at a comparatively short range, such as the range of a single room, while the other module operates at a comparatively longer range. Advantageously, in this embodiment, the power switching device 10 is configured to communicate with multiple types of devices that have only one mode or protocol of wireless communication. In the embodiment shown, the modules for wireless communication include a Wi-Fi transceiver 22 and Bluetooth Low Energy transceiver 24. An advantage of using these two modules is that the Bluetooth Low Energy transceiver 24 can be utilized to communicate with local Bluetooth devices that need to use comparatively low energy, e.g., battery operated, while the Wi-Fi transceiver 22 can be used for comparatively longer range communication, e.g., a Wi-Fi internet access point. However, the modules can be configured to operate using any mode of wireless communication currently known or may later become known, including but not limited to, R-F communication, infrared communication, Bluetooth communication, Bluetooth low energy (BLE), cellular, and Wi-Fi communication.

AC power board 30, seen in FIG. 4, is electrically connected to power connector 46. AC power board 30 is also electrically connected to other modules within power switching device 10, such as wireless communication board 20 and power meter board 40. Power board 30 includes an AC/DC converter for converting alternating current line power flowing into the power switching device 10 from the electrical outlet to which the power switching device 10 is electrically connected (e.g., via power connector 46) into direct current power suitable for powering the various modules and functions of power switching device 10. Power board 30 may also contain a voltage converter converting the line voltage to a suitable voltage for the power switching device 10 components.

Power meter board 40, whose location is indicated in FIG. 3, is electrically connected to internal socket 34. Power meter board 40 is configured, as would be understood by those of ordinary skill in the art, to measure the power flowing to a device plugged into socket 34. Power meter board 40, for example, may include a voltmeter (not shown) that can measure the tension across an embedded low impedance resistor to determine the current drawn by an external appliance (not shown) that is plugged into internal socket 34. Though in the illustrated embodiment one internal socket 34 is shown, as should be appreciated, the switching device 10 may include more than one socket 34 to provide electrical power to multiple devices.

In some embodiments, the internal module 60 also includes an electronic thermometer for measuring the temperature of the internal module 60. In other embodiments, the internal module 60 includes a hardware authentication module that can authorize communication with specific external radio devices. The hardware authentication module can use any method of authorization or encryption, known to those of skill in the art, including, for example, RSA, Diffie-Hellman (DH), or elliptic curve cryptography (ECC).

Internal module 60 also includes a microcontroller 65 for controlling the various functions of power switching device 10. The microcontroller 65 may include a software storage device and a CPU. The storage device may comprise any suitable, computer-readable storage medium such as disk, non-volatile memory, etc., as will be understood by those of ordinary skill in the art (e.g., read-only memory (ROM), erasable programmable ROM (EPROM), electrically-erasable programmable ROM (EEPROM), flash memory, field-programmable gate array (FPGA), etc.). Software contained or embedded on the storage device may be embodied as computer-readable program code and executed by the CPU using any suitable high or low level computing language as would be understood by those of ordinary skill in the art, such as, but not limited to, Python, Java, C, C++, C#, .NET, MATLAB, etc. The CPU may include any suitable single- or multiple-core microprocessor of any suitable architecture that is capable of implementing and running a control protocol for the functions performed by power switching device 10.

The microcontroller 65 may, via its software, one or more of the following functions, in response to a user command: turn the relay or other switch on and off, for controlling the power delivered to a device plugged in to socket 34; turn individual LEDs on and off; and/or change the color or brightness of the LEDs, in accordance with a user's desire to use the light bar 18 in a particular fashion, such as for signaling or night light use. The microcontroller 65 may also be configured to control the switch that may in certain embodiments be manually operated by button 38, and execute wirelessly delivered commands for the switch.

The microcontroller 65 may also direct the wireless communication module to transmit a beacon message to any electronic device within a particular range of the power switching device 10. The beacon function enables the switching device 10 to transmit signals, such as targeted messages or information, to any mobile device within a certain range. In some embodiments, the range of the beacon function is approximately 200 feet. An exemplary protocol for a beacon function is the iBeacon protocol developed by Apple, Inc. The beacon function, can for example, transmit to a user the status of the switching device 10, the status of a device plugged into the socket 34 (e.g., power on or off), the status of a device in wireless communication with the switching device 10, or any other desired information as programmed in the microcontroller 65. By way of example, if the switching device 10 is in wireless communication with a carbon monoxide detector that is programmed to wirelessly transmit an alert, e.g., to the switching device 10, if an elevated or dangerous carbon monoxide level is detected, the switching device 10 can transmit a beacon message that will be received by a user's remote device warning of the danger. For example, the beacon message could warn persons approaching the location not to enter due to the dangerous conditions. Advantages of the invention include that, using the above as an example, that the multi-mode communication capabilities of the switching device 10 may permit in some embodiments transmission of the beacon message over multiple protocols, including longer range protocols than the carbon monoxide detector may have (e.g., Wi-Fi as opposed to Bluetooth), providing earlier warning to persons. In addition, as the switching device 10 is connected to an electrical power line, there is no risk of the transmission of the message terminating due to a drained battery, e.g. of the carbon monoxide detector.

The Bluetooth Low Energy transceiver 24 may also detect proximity of remote devices (e.g., mobile devices), and the microcontroller 65 may direct certain actions in response to such proximity. Physical proximity can be monitored by measuring the strength of a signal received (e.g., dB strength) from a remote electronic device. The microcontroller 65 can be programmed with an algorithm or table that correlates signal strength with distance. For example, upon determining that a user's smart phone is within a certain distance of the switching device 10, the microcontroller 65 can instruct a Bluetooth-connected lamp to turn on, or some other device (e.g., heating/cooling, music player, etc.). By way of another example, the microcontroller 65 can be directed to actuate the relay switch, i.e., that is operatively connected to button 38, when the proximity sensor is triggered, thereby powering the device plugged into the socket 34. Likewise, the proximity function can turn off a device or take other action when it detects the user (via the user's smart phone) has moved a certain distance away from the switching device 10. For example, when the user moves a certain distance away from the switching device 10 indicating the user has left the premises, the switching device 10 can transmit a command signal to a door lock (e.g., via BLE) to lock the door and secure the premises.

The proximity capability of the switching device 10 has various advantages over known detection systems, such as motion sensors, heat sensors, laser, ultrasound or radar detection systems because it does not rely on or require line of sight to detect the user. Moreover, some systems, such as some types of motion sensors, can be "fooled" into determining that no one is present, such as when, for example, the person is motionless or relatively motionless. In addition, many prior systems require a delay or period of time in which no one is detected before taking further action, e.g., shutting off a light. This delay results in wasted energy. In contrast, the invention permits devices to be controlled based on the present location of the user.

The microcontroller 65 may also store and transmit information about the operation of the power plug to a user. For example, the microcontroller 65 may store and transmit information from the thermometer about the temperature of the power plug, or about the electrical current delivered to an appliance that is electrically connected to power receptacle 36. The microcontroller 65 may also store authentication tokens that are used to authorize connection with certain remote devices, in accordance with the security protocol installed on the hardware authentication module.

Figure 5B:
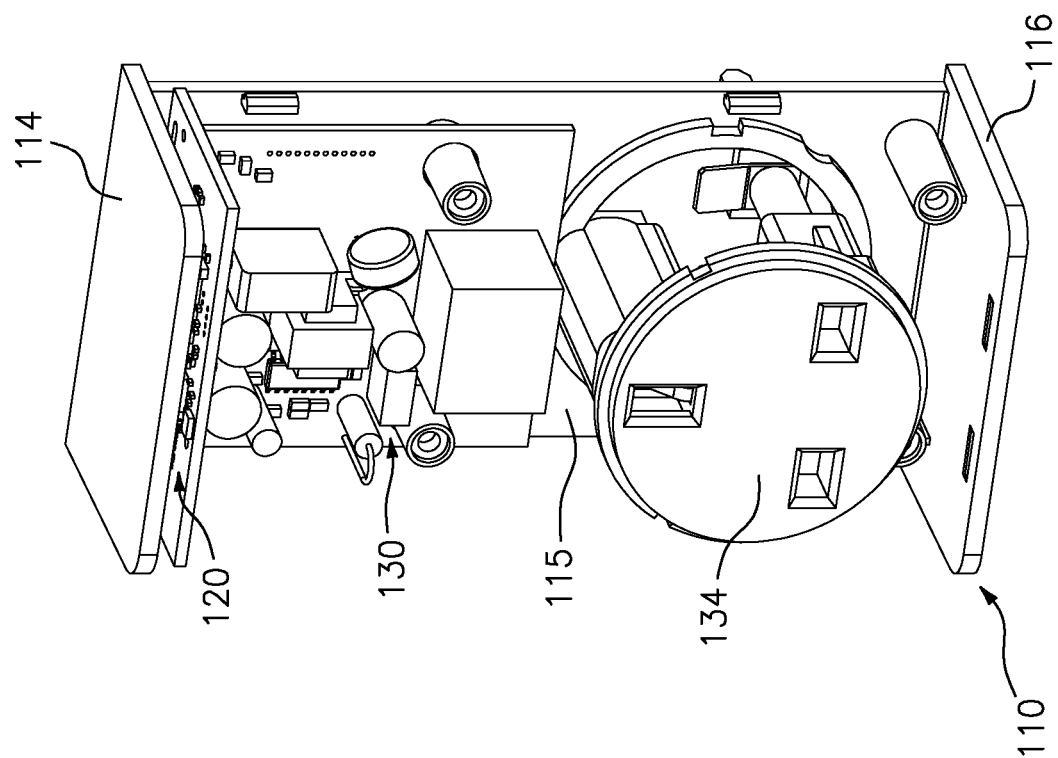
FIG. 5B is a view of the power switching device of FIG. 5A with the front portion of the housing removed.
Figure 5A:
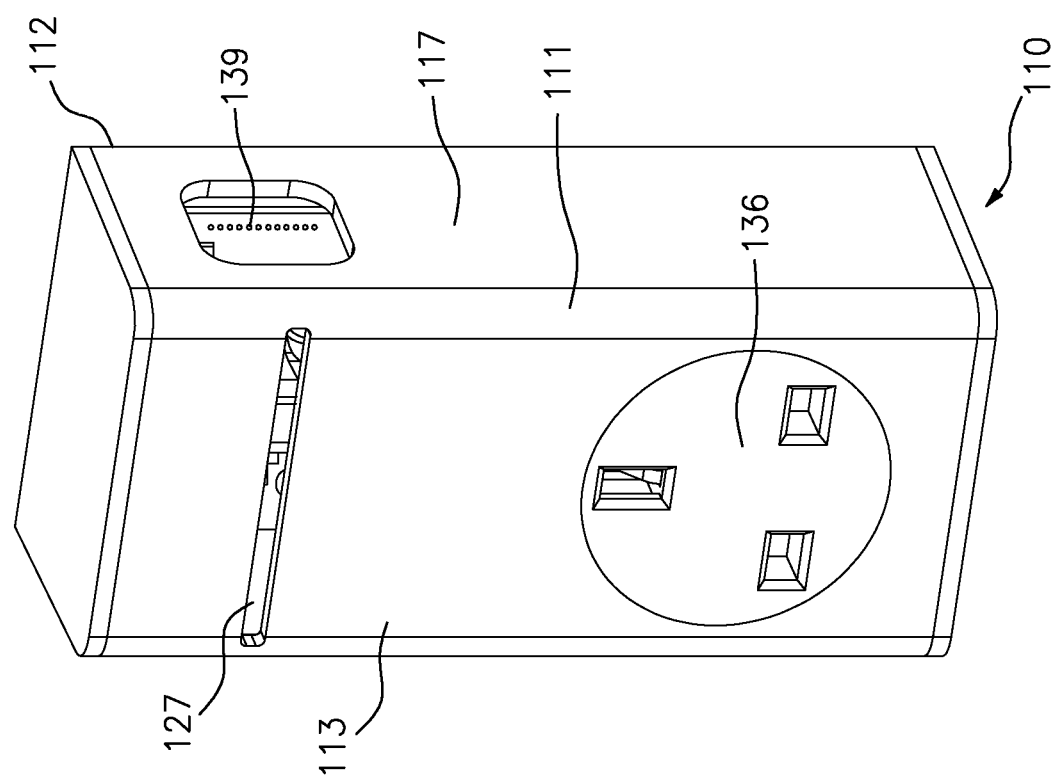
FIG. 5A is a front elevational view of a second embodiment of a power switching device.

FIGS. 5A and 5B illustrate another embodiment of a power plug 110. Power plug 110 may comprise the same or similar internal components and functionalities as power plug 10 of FIGS. 1-4. The primary difference between the embodiment of FIGS. 5A and 5B and the embodiment of FIGS. 1-4 is that external power receptacle 136 and internal socket 134 have a different configuration. The illustrated configuration is suitable for use, for example, in the United Kingdom, Ireland, Malta, Malaysia, & Singapore. It should be noted that the power switching device 110 has a "vertical" configuration, as opposed the "horizontal" configuration of the power plug 10. As discussed above, though, the power switching device 10, 110 can be configured for use with any configuration of plug and socket that is known, or may become known.

Similar to power switching device 10, housing 112, consisting of casing 111, top cover 114, and bottom cover 116, forms a substantially brick-like shape, though it can form any suitable or desired shape. The longest axis of the substantially brick-like shape is oriented in a vertical direction. In this orientation, more than one power switching device 110 may be plugged into a faceplate with multiple outlets that are horizontally aligned, in a configuration resembling a row or line. As discussed in connection with power switching device 10, the power switching device 110 may take any geometric shape suitable for containing the elements and effecting the functions described herein.

In addition, in the depicted embodiment, both opening 127 that receives or permits viewing of a status indicator (not shown) and power receptacle 136 are located on the front face 113 of the casing 111. Opening 127 extends horizontally across casing 111, and thereby, the status indicator in the illustrated embodiment provides similar functionality as status indicator 18. Opening 139 within the side face 117 receives or permits access to a button (not shown) adjacent to AC power board 130. As in the embodiment of FIGS. 1-4, the button is suitable for controlling controls a relay or other electrical power switch for selectively controlling power flow to a device that is plugged into socket 134.

Figure 6:
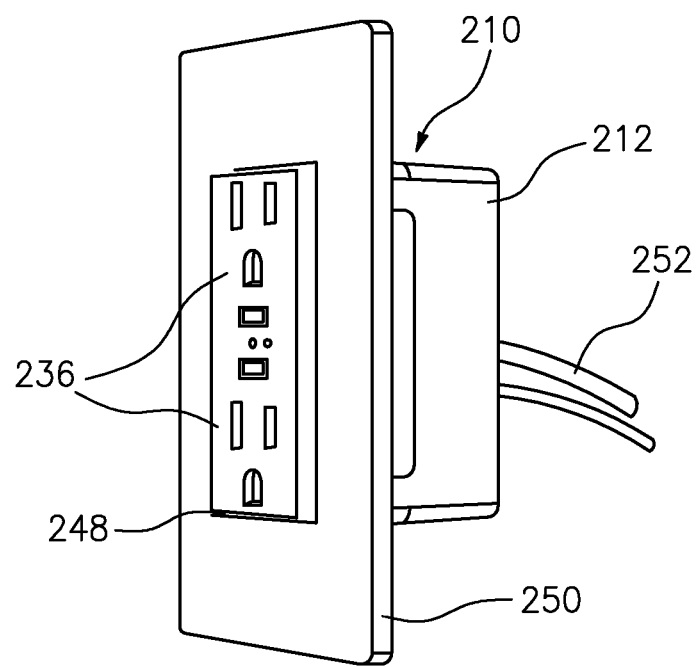
FIG. 6 is a side perspective view of a third embodiment of a power switching device.

In FIG. 6, another power switching device is indicated generally by the reference numeral 210. The device 210 is substantially similar to the devices 10, 110 described above in connection with FIGS. 1-5, and therefore like reference numerals preceded by the numeral "2" are used to indicate like elements. Further, although not shown for this device 210, the internal components of the device 210 may be substantially the same as the internal components of devices 10, 110 to control and operate the device 210 in substantially the same manner as in devices 10, 110. The internal components may be modified in a manner as would be understood by those of ordinary skill in the art to accommodate the herein described structure and functions of the device 210, including the differences between the devices 10, 110 and the device 210. The principal difference between the power switching devices 10, 110 of FIGS. 1-5 and the power switching device 210 of FIG. 6 is that the power switching device 210 is configured to be installed within or through a wall opening 248 in a wall 250, such that a portion of the device 210 is embedded or extends behind that wall 250, rather than a "stand-alone" device that is placed outside. In the illustrated embodiment, the device 210 is configured to fit into a wall opening used for a common wall electrical socket. Advantageously, the power switching device 210 is thereby protected from inadvertent damage. Also advantageously, the power switching device 210 does not protrude from the wall, and appears to the user as a regular electrical outlet. Rather than using a power connector that must be connected to an electrical outlet, e.g., by a plug or prongs, the power switching device 210 draws power directly from building power, through electrical connection with electrical wires 252 running through or within the wall 250. In the illustrated embodiment, power switching device 210 contains two power receptacles 236, which are stacked in a conventional fashion for electrical outlets. As discussed above in connection with the embodiment of FIGS. 1-5, each of these power receptacles can be controlled together with a single internal power switch or controlled separately.

It should be understood by those of ordinary skill in the art that although the power switching device 210 has two power receptacles 236, it can have any number of power receptacles, or none at all, in any suitable or desired configuration. In some embodiments, the device 210 has a configuration of known electric wall receptacles (other than the two-socket configuration shown in FIG. 6). One result of using known receptacle configurations is that the device 210 can utilize known or standard electrical boxes, wall openings, wall plates, etc. This can simplify installation, without increased cost for custom boxes, plates, etc. It may also permit an existing standard wall receptacle to be replaced with the device 210 without having to alter the in-wall electrical box, wall opening, wall plate etc., enabling a simple "swap out" of parts. Another result is that the device 210 may have a similar appearance to existing electrical wall fixtures, which may be aesthetically desirable. For example, the device 210 may have a similar appearance to other, standard wall fixtures in the room or building.

Figure 7:
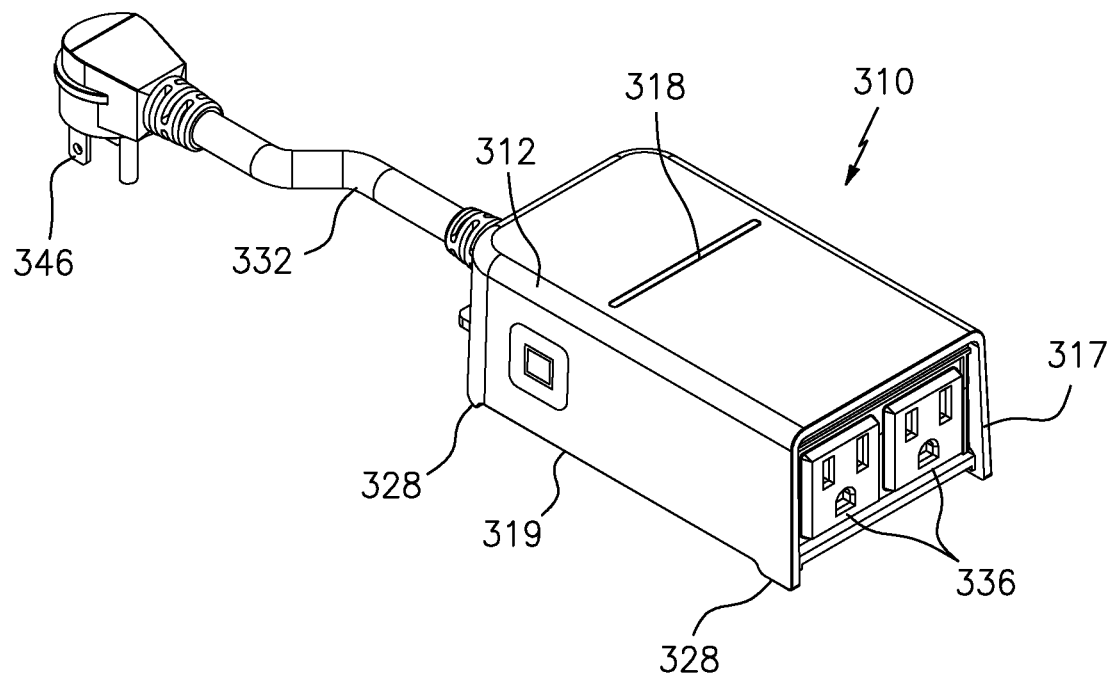
FIG. 7 is a top perspective view of a fourth embodiment of a power switching device.

In FIG. 7, another power switching device is indicated generally by the reference numeral 310. The device is substantially similar to the devices 10, 110, and 210 described above in connection with FIGS. 1-6, and therefore like reference numerals preceded by the numeral "3" are used to indicate like elements. Further, although not shown for this device 310, the internal components of the device 310 may be substantially the same as the internal components of devices 10, 110, 210 to control and operate the device 310 in substantially the same manner as in devices 10, 110, 210. The internal components may be modified in a manner as would be understood by those of ordinary skill in the art to accommodate the herein described structure and functions of the device 210, including the differences between the devices 10, 110, 210 and the device 310. The principal difference between the power switching device of FIG. 7 and the preceding embodiments are as follows. Device 310 has a housing 312 made of a hard casing material and supports 328 extending from side faces 317, 319 of the housing 312. The supports 328 thereby enable the device to rest on a surface in a manner that raises or distances the internal components of device 310 from any potentially harmful substances on the surface, e.g. water. In addition, the power switching device 310 receives power from a power cord 332 having one end secured to the housing 312 and a power connector 346 at the other end of the cord 332. Electrical wiring (not shown) extends from the power connector 246, internally through the cord 232, and through an opening (not shown) in the housing 312, and is electrically connected to the internal components of the device 312 for delivering electrical power from the power connector 246 to the components of the device 210.

In the illustrated embodiment, the power connector 346 is an electrical plug suitable for connection with an electrical socket (not shown). The power switching device 310 is thus suited for to be placed at a distance from a wall outlet (not shown), both indoors and outdoors, and then electrically connected to the wall outlet via electric cord 332.

Those of ordinary skill in the art should understand that, although in FIG. 7 the power connector 346 is a plug, the power connector 346 may be of any configuration, currently known or later to be developed, suitable to connect to an electrical power source to deliver power to the device 310 through the power cord 332. In yet other embodiments, the device 310 does not have an electrical connector 346, and the wiring in the power cord 332 may be directly connected, e.g., "hard-wired" to an electrical source. It should also be understood that the power cord 332 may be of any desired length so that the device 310 may be located at a desired location relative to the power source, e.g., a wall socket.

Figure 8:
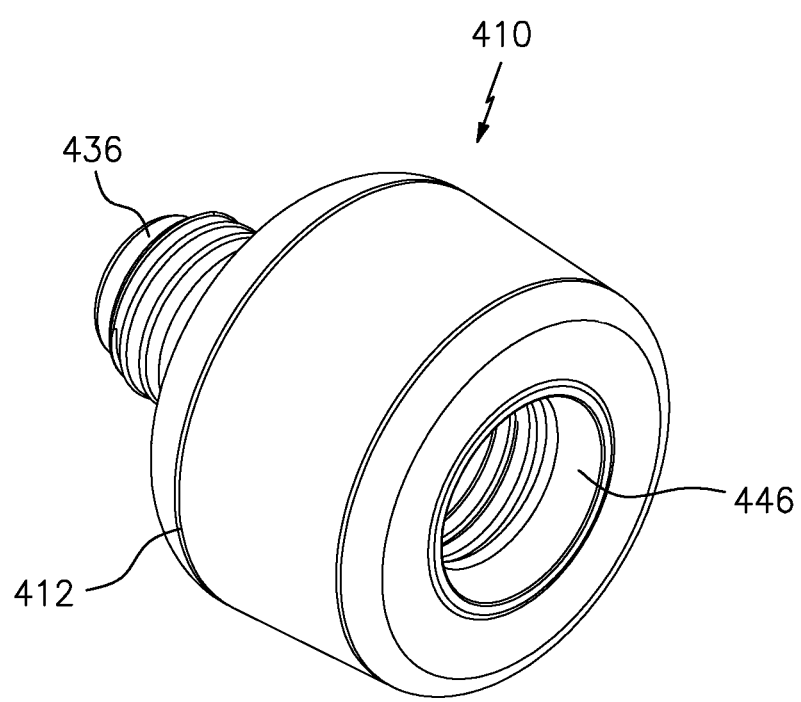
FIG. 8 is a top perspective view of a fifth embodiment of a power switching device.

In FIG. 8, another power switching device is indicated generally by the reference numeral 410. The device is substantially similar to the devices 10, 110, 210, and 310 described above in connection with FIGS. 1-7, and therefore like reference numerals preceded by the numeral "4" are used to indicate like elements. Further, although not shown for this device 310, the internal components of the device 410 may be substantially the same as the internal components of devices 10, 110, 210, 310 to control and operate the device 410 in substantially the same manner as in devices 10, 110, 210, 310. The internal components may be modified in a manner as would be understood by those of ordinary skill in the art to accommodate the herein described structure and functions of the device 410, including the differences between the devices 10, 110, 210, 310 and the device 410. In this embodiment, the internal components (not shown) of the power switching device 410 are encased in a substantially cylindrical housing 412. The device 410 is configured to be engaged into a light bulb socket, e.g., of a lamp or other lighting fixture. Power connector 446 comprises a male light bulb cap that can be screwed into a light bulb socket, such as an Edison socket. Although power connector 446 is depicted as having a screw base, those of skill in the art will recognize that the power connector can take any shape known to those of skill in the art for connecting to light fixtures, e.g., a pin base, a bayonet base, a wedge base, a mogul pre-focus base, etc. Power receptacle 436 is configured as a female light socket, such as an Edison socket. Thus, power switching device 410 may be inserted, e.g., screwed, into a light fixture and may deliver power to a light bulb or other electrical device inserted (e.g., screwed) into the power receptacle 436. Although power receptacle 436 is depicted as capable of receiving a light bulb with a screw base, those of ordinary skill in the art will recognize that the device 410 may be configured to connect with a light bulb having any base known to those of skill in the art, e.g., a pin base, a bayonet base, a wedge base, a mogul pre-focus base, etc. Those of ordinary skill in the art should also understand that the light fixture and light bulb (or other device connected to the socket 436) may operate in different embodiments using any voltage currently in use or known to those of skill in the art, such as 120V or 236V. Advantageously, power switching device 310 permits direct monitoring of consumption of energy by a light bulb that draws energy from a light fixture. In addition, the power switching device 410 need not be located at a wall or wall socket such as the embodiments shown in FIGS. 1-5, or have a power cord as the embodiments shown in FIG. 7. In the illustrated embodiment, the power cord of the lamp or fixture itself provides the power to the device 410. This embodiment may provide additional flexibility as to the location of the device 410, e.g., situated centrally in a room as compared to a wall location, and thereby be more selectively, e.g., more optimally, located with respect to remote devices with which the device 410 may communicate. In such embodiments, the device 410 may, in certain situations, be placed within range of more remote devices than might be achieved with the embodiments of FIGS. 1-7.

Figure 9:
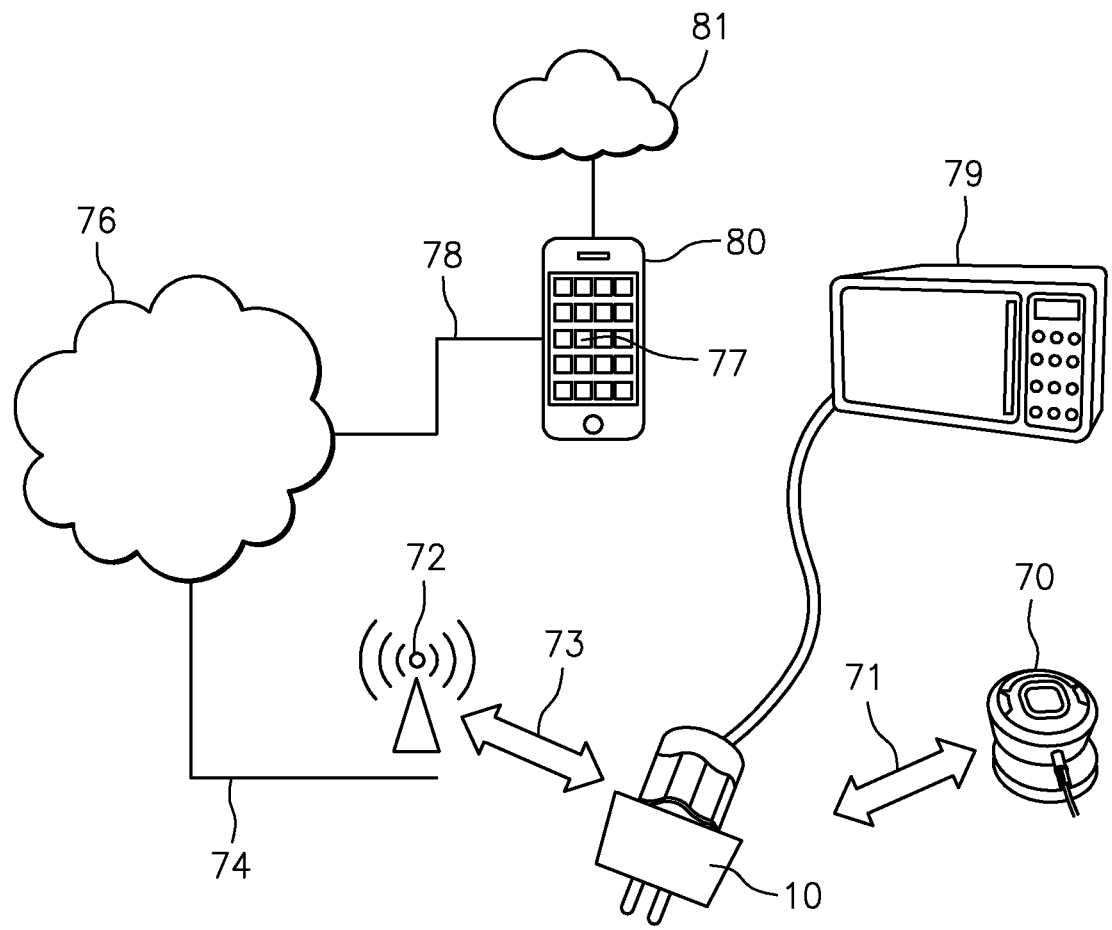
FIG. 9 is a schematic illustration of a system including a power switching/bridging device, a wired appliance, a remote device, and an Internet-of-Things connected computing device.
Figure 10:
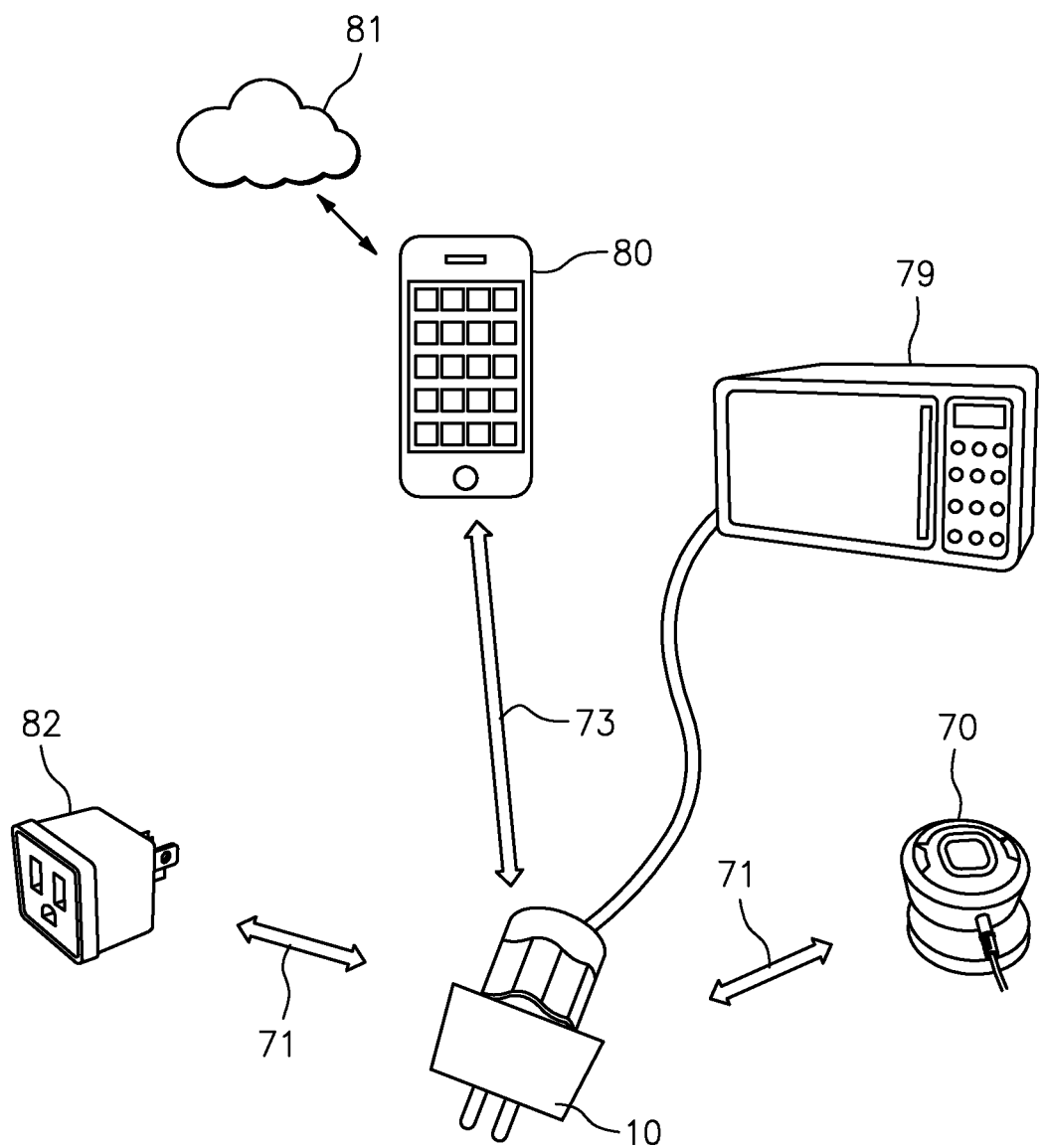
FIG. 10 is a schematic illustration of a system including a power switching/bridging device, a wired appliance, multiple remote devices, and a wireless computing device.
Figure 11:
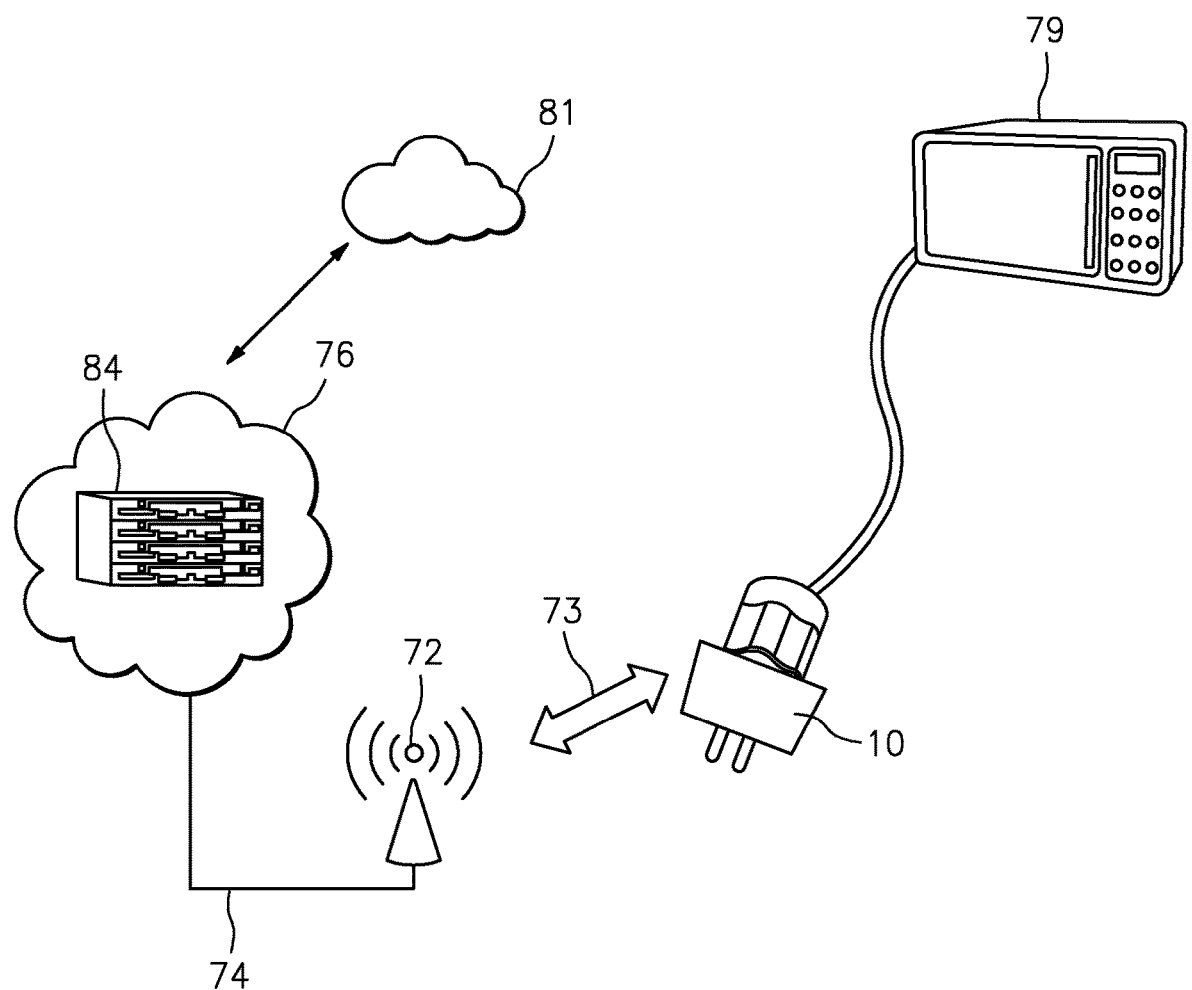
FIG. 11 is a schematic illustration of a data connection between a power switching device and a remote computer.

FIGS. 9-11 schematically depict various systems in which a power switching device of the invention may be employed. In the embodiments shown, a power switching device 10 that may be plugged into a wall outlet is depicted. However, a device of any suitable configuration, including but not limited to the devices 110, 210, 310, and 410 described herein, may be utilized in the systems of FIGS. 9-11.

As shown schematically in FIGS. 9-11, the power switching device 10 may be used as part of a system or IoT network for one or more functions described more fully below, e.g., communications bridging; remote control of devices; remote monitoring of devices; monitoring of alarm state conditions of remote devices and systems, and data storage. The system may perform these functions with reference to remote devices, which may be connected only wirelessly to the power switching device 10, and also to powered devices, such as plug-in devices, e.g. appliances, that receive electrical power from the power switching device 10. Examples of devices that may be connected, monitored, or controlled, or may generate data for storage in such a system, may include the power switching device 10 itself, thermostats, door locks, personal sensors such as thermometers, personal locators, occupancy sensors, sound and entertainment systems, child sleep monitors, alarms, lighting systems, including dimming or motion control, environmental monitors, and plug-in appliances. It should be understood that the preceding are merely some examples of devices that may be included in systems of the invention, that the invention is not limited to such examples, and that any devices, either currently existing or later to be developed, may be used with the invention.

With respect to bridging functions, as shown in the embodiment illustrated in FIG. 9, the power switching device 10 may serve as a communications bridge, or a relay, between a remote device 70 and a computing device 80. Commands or telemetry from any remote device paired with the power switching device 10 may be translated by firmware in the power switching device 10 (i.e., embedded code in the microcontroller 65) and subsequently transmitted, such as via Wi-Fi or Bluetooth, to an IoT connected computing device, and vice versa. As shown in FIG. 9, remote device 70, depicted as a wireless thermometer, is equipped with, for example, Bluetooth radio for communication using a Bluetooth protocol 71. Remote device 70 transmits information, such as temperature, to power switching device 10. Power switching device 10 is equipped with a communications module that is adapted to transmit information using Bluetooth communication protocol 71 and Wi-Fi communication protocol 73. Power switching device 10 receives the temperature data from remote device 70 via Bluetooth protocol 71, and it translates the information into Wi-Fi communication protocol 73.

As further shown in FIG. 9, computing device 80 is communicatively connected to the power switching device 10 through a communication path. In the illustrated embodiment, this path includes an internet access point or radio beacon 72 for the wireless communication module (e.g. Wi-Fi) with the power switching 10, an internet service provider (represented by communication lines 74) for communication with public Internet (represented by cloud 76), and an internet service provider (represented by communication lines 78) providing communication from the Internet to the computing device 80, which may be the same or different than internet service provider 74. The computing device 80 may also be connected to other devices within an IoT network, represented by cloud 81.

The system may include a computer program, e.g., an application, for interface between the user of the computing device 80 and the communication path to communicate with the power switching device 10, and in certain embodiments, a remote device, such as remote device 70. In some embodiments, the computer program may be stored as an application on computing device 80. An exemplary application on the computing device 80 may display, for example, a graphical user interface 77 that simulates the remote device's control system, e.g., a control panel. The computing device 80 used to receive or transmit the information may be any suitable computerized device, e.g., a smart phone, a tablet, a mobile computer, a desktop computer, etc.

In this manner, the computing device 80 may receive information from the remote device 70, even if the remote device 70 does not have a communication interface that permits the remote device 70 to transmit information to the internet access point 72. The remote device 70 can then, for example, utilize a battery with a reasonable expected battery life.

While, in the foregoing example, the power switching device 10 operates as a communications bridge between Bluetooth and Wi-Fi protocols, it should be understood that devices 70 and 80 may communicate with the power switching device 10 using any suitable communication system and protocol. For example, and without limitation, remote device 70 and computing device 80 may be paired with the communications bridge using one of Bluetooth or Bluetooth low energy, infrared frequency, 802.11 frequency, ultrasound frequency, Zigbee™ frequency, ISM Band radio location spectrum frequency such as, but not limited to 420 Mhz to 450 Mhz and 902 Mhz to 928 Mhz, or GSM Band radio frequency such as, but not limited to, GSM-450 and GSM-900. In some embodiments, the remote devices may operate with Wi-Fi protocol but without access point privilege.

Still referring to FIG. 9, a user can input a control command directed to a remote device 70 from the computing device 80, or from any other IoT device (not shown)

communicatively connected to computing device 80. The communication can be entered in any way known or that may later become known to those of skill in the art, including through a keypad, touch screen, or voice command. For example, when a remote device is equipped with the HomeKit® command system distributed by Apple Inc., a user is able to transmit commands to power switching device 10 and remote device 70 simply by issuing a voice command to the Homekit system. Alternatively, the computing device 80 can contain a program that controls the remote device 70 without specific user input into the computing device 80.

The communication is then sent from the computing device 80 through the internet 76 to the internet access point 72, which transmits the communication, e.g., by Wi-Fi protocol 73 to the power switching device 10. Power switching device 10 then translates the command to Bluetooth protocol 71 and transmits it to remote device 70. In this fashion, Bluetooth enabled remote device 70 can be controlled via the Internet. As an example, the computing device 80 can instruct the remote device 70 to turn on or off. As another example, if the remote device is a thermostat that is operatively connected to a heating or cooling system, the user can instruct the thermostat to activate the heating/cooling system as desired. The remote device 70 may also, in certain embodiments, transmit information through the communication path to the computing device 80. For example, the remote device 70 may transmit the temperature measured/sensed by the remote device 70, so that the computing device 80 may take action based on the information, according to its programming, and/or inform the user of the information, e.g., the temperature, via the graphical user interface 77 of the computing device 80, or other communication mechanism, for example, e.g., voice, transmission of the data to a further computing device (not shown), etc., e.g., via the Internet or wireless transmission (such as, for example, WiFi or Bluetooth).

Another example relates to remote communication with "smart" door locks. Smart door locks are often powered by batteries because electrical wiring from the building power system to the door lock is not practical for many door designs or is expensive, especially in retrofit applications. To save power, smart locks are often equipped with only Bluetooth or Bluetooth Low Energy communication radios. In systems of the invention, a user can enter a communication, such as a command, using an application on a computing device 80 to control the smart door lock, such as to lock or unlock the door. The command is then transmitted via the internet 76 and access point 72 to the power switching device 10. The power switching device 10 then converts the communication to Bluetooth or Bluetooth Low Energy protocol, and transmits the communication to the smart door lock. The smart door lock then responds to the communication, e.g., by unlocking the door. The smart door lock then can, in certain embodiments, transmit information back to the power switching device 10 (e.g., status of the door lock as locked or unlocked) via Bluetooth. The power switching device 10 transmits this information to the internet access point 72, e.g., via translation to Wi-Fi protocol, and the information travels back to the computing device 80 via the internet, e.g., confirming the action desired by the user has been completed.

The system may also utilize the power switching device 10 to remotely control the operation of powered device 79 electrically connected to the power switching device 10. In the illustrated embodiment, powered device 79 is represented as a microwave oven. However, as discussed above, powered device 79 may be any device operating via electrical power that is known or may become known.

In some embodiments, applications running within an IoT environment may use data from sensors (not shown) to change the connection state of powered device 79 from on to off, or the opposite, based on preselected values. This may be done directly via user input into a computing device 80, or may be done using programming a preset time or other limits. The sensors may be connected to the IoT connected via bridge functions within the power switch 10, connected via other power switch bridges, or connected by other means to the IoT. For example, the sensors can be heat sensors or motion sensors. The heat sensors or motion sensors can be programmed, as should be known to those of ordinary skill in the art, to send a signal to the computing device 80 if they do not detect persons within an area after a given period of time. Alternatively, the computing device 80 may be programmed so that, if it does not receive a signal from the paired or otherwise communicatively connected sensors that a person is present in the sensing area within a certain, e.g., preset, period of time, to conclude that no person is present in the area. The computing device 80 can then send a signal to the power switching device 10 to turn off lighting that is electrically or wirelessly connected to the power switching device 10. In a similar fashion, the system may be programmed to turn on an attic fan if temperature rises above a given value and turn it off after temperature decreases below a set point. The data that is collected from these sensors may be stored within the computing device 80, or within any device capable of such storage and connected to the IoT. The system may also store various other types of data within any device capable of such storage and connected to the IoT, including but not limited to data related to power usage and to states of connected power devices, e.g. on/off.

As discussed above, when the power switching device 10 is placed in an area, such as a room, any device within wireless range of the power switching device, or any powered device receiving electrical power from the power switch, can be wirelessly connected through the power switching device 10 to one or more devices capable of data storage. This storage may permit recording of data generated by a device that lacks internal memory storage, or provide a consolidated location for storage of data from multiple devices, e.g., for access by a user. For example, the power usage of a powered device 79, such as a lamp, may be recorded and stored in memory storage based in cloud 81. In addition, the data may be stored on any device connected to the IoT network, including, without limitation, computing device 80 or the power switching device 10. Such monitoring of power usage can be obtained through any method known to those of skill in the art, such as an integrated current monitor in power switching device 10, e.g., such as described above. In addition, data may be collected and stored related to devices that are not easily connected to a collective usage or control application or internet access point, e.g., a powered device 79 that lacks capacity for wireless communication. Advantageously, this data may be collected from the remote device 70 or powered device 79, e.g., by a power measurement circuit or other sensing component in the device 10, even though there is no phone or other computing device directly paired to the remote device 70 or powered device 79. Applications running on computers, phones, tablets, or other smart devices may then access this data as well as control the devices connected via the IoT power switch.

In a similar fashion, the system may be used to detect and generate a message regarding an alarm condition. An application for detecting and alerting to alarm conditions may be stored, and may run on, any suitable device within the system, e.g. power switching device 10, computing device 80, or a device from the cloud 81. Notably, the application need not be stored on the device whose alarm state is being monitored. The alarm condition may consist of any development that is an important deviation from the normal. Alarm conditions may include, for example, that current through the power switching device 10 has surged above a predetermined value or that power has been cut from powered device 79, e.g., a lamp or thermostat. Such an alarm condition may be caused, for example, by a power outage or a power overload. The alarm condition may also relate to a condition of remote device 70, e.g., that remote communication between power switching device 10 and remote device 70 has been severed. The alarm condition may also relate to a condition of the environment that is detected by remote device 70. For example, remote device 70 may be a water detector in a basement that is configured to detect a leak. Remote device 70 may transmit information about this alarm state to other devices or a computing device 80 that are connected to the system, e.g., via the powered switching device 10, as described above. In this manner, the remote device 70 may reliably operate for extended periods of time without depleting the battery. This is especially advantageous when the remote device 70 is located in a location that is not easily accessible to perform battery replacement or recharges.

The system may utilize any means known to those of skill in the art to communicate the alarm condition to a user. These may include, for example, emission of sound from computing device 80, transmission of light signals from the status monitor of the power switching device 10, or delivery of a short message service (SMS) message to a user's cell phone. The system may further be programmed to perform a certain control function upon the occurrence of an alarm condition. For example, upon the delivery of an abnormally high current to powered device 79, the system can direct power switching device 10 to shut off power to powered device 79.

FIG. 10 depicts an illustrative system in which the power switching device 10 communicatively connects multiple devices 70, 82, and a computing device 80. In some embodiments, devices 70, 82, may operate using the same communications protocol, e.g., they are both Bluetooth enabled devices. In some such embodiments, though, devices 70, 82 are located too distant from each other to communicate directly. Both the devices 70, 82 may then communicate with the power switching device 10, e.g., via Bluetooth protocol 71. The power switching device 10 can thus in effect serve as a transceiver or base station for the accessory devices 70, 82. The device 10 may thereby enable control of, monitoring of and/or reception of data from accessory devices 70, 82 that are within range of the power switching device 10.

In other embodiments, devices 70, 82 utilize different or incompatible communication protocols that prevent them from communicating directly, even if they are within range of each other. Power switching device 10 in such embodiments may translate between the different communications protocols and thereby serve as a bridge between devices 70, 82, as discussed above in connection with FIG. 9. Power switching device 10 may, in some embodiments, communicate information between device 70 and device 82 and computing device 80. In the illustrated embodiment, power switching device 10 translates information from Bluetooth protocol 71 and communicates with computing device 80 using Wi-Fi protocol 73. However, the power switching device may also communicate with computing device 80 using the same communications protocol as devices 70 and 82, e.g., devices 70 and 82 both use Bluetooth or BLE protocol, and computing device 80 is in Bluetooth/BLE range of and paired to the device 10. In some embodiments, for example, power switching device 10 transmits information to computing device 80 only when requested by a user, or only when the user brings computing device 80 to within range of a proximity sensor in power switching device 10. In some such embodiments, the device 10 can switch between Bluetooth/BLE and Wi-Fi protocol as the computing device 80 moves within and out of Bluetooth/BLE range of the device 10.

The invention thus permits communication between devices 70, 82 that otherwise would not communicate with each other, e.g., due to physical distance separating them or incompatible protocols. In addition, the computing device 80 may monitor and/or be used to control one or more of the devices 70, 82.

For example, in the embodiment shown in FIG. 10, power switching device 10 provides a communications link between a wireless thermometer 70 and wireless power cube 82. If device 82 has a heating/cooling unit plugged into it, thermometer 70 may send a temperature signal to device 82, via power switching device 10, wherein device 82, based on the reported temperature, then activates the heating/cooling unit to control the temperature in the location of the heating/cooling unit. Thermometer 70, in further embodiments, may communicate the measured temperature to the computing device 80 via the power switching device 10, and plug 82 may communicate information about the heating/cooling unit 82, via the power switching device 10, to the computing device 80, e.g., power status (on/off), energy usage, operating time, etc. In yet further embodiments, the computing device 80 may transmit command instructions to one or more of the devices 70, 82 via the power switching device 10. This is accomplished even though device 70, device 82, and/or the computing device 80 do not (and in some embodiments cannot) communicate directly with each other, e.g., for the reasons discussed above.

Although FIG. 10 illustrates only two devices being communicatively connected to the power switching 10, the power switching device 10 can be used and configured to bridge as many devices as desired that are situated within the communications range of the power switching device 10. Thus, a user can communicatively connect a number of accessory devices via the power switching device 10, such as lights or lamps, and then communicatively connect, through the power switching device 10, to control (e.g., turn on and off) all the lights, or some subset of the lights communicatively connected to the power switching device 10. Advantageously, this capability allows for a user to connect via the user's computing device 80, to a single device, the power switching device 10, rather than connecting to each accessory device individually. This is particularly advantageous in a "connected" home, set up with various home automation devices, such, for example, as plugs and/or outlets, wall switches, power strips, lamps, thermostats, garage door openers, door locks, and appliances. It should be noted that though in the embodiment of FIG. 10 the computing device 80 connects directly with the power switching device 10, in other embodiments the computing device 80 can connect to the plug via an indirect path, e.g., the internet, local intranet, intervening smartplug(s), or other communications system.

In addition, the power switching device 10 may include firmware that provides cohesive communication (i.e., direct, unified, and seamless)) between as many devices as desired that are within range of the power switching device 10. Further, the firmware may be adapted to provide for a plurality of such cohesive communications. In some embodiments, the firmware provides for a number of communications to the same number of device controller pairs, with each communication directed to a different device. The firmware may bridge the communications between each of the device controller pairs. In some embodiments, the many devices all communicate using the same protocol. For example, numerous Bluetooth connected devices (not shown) may be synchronized and controlled using the power switching device 10 as a communications bridge. In such embodiments, numerous remote devices may be controlled through interaction with each other, without requiring utilization of a different communication protocol or connection to the IoT network.

FIG. 11 illustrates another embodiment of a system in which the power switching device 10, for example, can be used to operatively connect devices, e.g., Bluetooth enabled appliances, with a remote computer system 84 and/or control such devices with the remote computer system 84. As described in FIG. 9 and FIG. 10, for example, the power switching device 10 is capable of receiving data from one or more devices (not shown in FIG. 11). The power switching device 10 then communicates via wireless communication, such as Wi-Fi protocol 73, to the remote computer 84. This communication may be accomplished through various waypoints, such as a Wi-Fi access point 72, internet service provider 74, and public internet 76. In some embodiments, a user can send information or a command from a remote computer 84 to the power plug using 10, e.g., using internet and Wi-Fi communication.

This data transferred to remote computer 84 may be used for any suitable purpose as should be understood by those of skill in the art. For example, the remote computer 84 may store and analyze electrical usage data received from the power switching device 10. This usage data, for example, can consist of times of the day when appliance 79 plugged into the power switching device 10 was turned on or off, the amount of electrical current drawn by the appliance during the "on" period(s), which corresponds to energy consumption, and the times of peak power usage by appliance 79. The remote computer 84 may also contain a program that analyzes this data and thereby determines an action to be taken, e.g., the most advantageous time to turn air conditioning on to achieve one or more desired goals, e.g., reduced overall power consumption, user comfort, etc. The remote computer 84 may also generate control instructions in view of information other than that received from the appliance, such as information received from another computing device connected to the system or the cloud (not shown in FIG. 10). For example, the remote computer may determine the most advantageous time to operate an air conditioner based both on past power consumption by the air conditioner, external temperature, and overall power usage in a power grid.

For each of the functions described above, the programming for carrying out these functions may reside on one device or on multiple devices that are connected to the IoT network. Thus, programs, applications, or data can reside, or be stored, on board the power switching device 10, in remote device 70, in computing device 80, in the cloud 81, and/or in any other device within the IoT network that is equipped with appropriate storage capabilities. Examples include, but are not limited to, the above-described remotely stored data, control applications, programmable alarm state conditions and warnings, data storage applications, data monitoring applications, and firmware that allows for cohesive communications between devices. By way of example, as described above, power switching device 10 may be programmed to generate an alarm signal whenever current passing through power receptacle 36 exceeds a predetermined value. This program may be stored exclusively as firmware on the power switching device, e.g., on the microcontroller 65. Alternatively, portions of the alarm program adapted to respond to changes in the current measured by the plug can be stored on the remote device 70, on computing device 80, or on any device connected to the IoT system.

In addition, although FIGS. 9-11 illustrate a wireless connection between power switching device 10 and remote device 70, each of the functions described above can accomplished via a wired connection, e.g., a USB-enabled device that communicates with the power switching device 10 through a USB connection, e.g., a USB cable. As discussed above, the power switching device 10 may include a USB port accessible through an opening 29 of the housing 12 of the power switching device 10. The USB connection may be utilized to control, monitor, or transfer data to the USB device. Furthermore, power switching device 10 may include a plurality of USB ports so that a plurality of USB devices may be connected thereto and remotely monitored and/or wirelessly controlled, e.g., by computing device 80, or a device within cloud 81, via the communications components of the power switching device 10. Similarly, data obtained from or associated with the USB devices may be stored within on board memory of the microcontroller 65 of the power switching device 10, "local" USB devices such as desktop computers, devices on the local network or the cloud, or any other device connectible to the USB device via the communications bridge of the device 10. Similarly, as described above in connection with powered device 79 and remote devices 70, 82, the system may include control applications for the USB device, and programs for detecting and alerting to alarm state conditions and warnings for connected USB devices in a similar manner as described herein with respect to wirelessly connected devices, except that the communication is through the USB cabling as opposed to wirelessly. Furthermore, as discussed above, these applications and programs may be stored on the power switching device or on any device connected with the IoT network, as described above. Similarly, the system may comprise firmware, stored on any suitable device within the system, that allows a plurality of cohesive communications interfacing between the power switching device and a USB device, and firmware that allows a plurality of cohesive communications interfacing between a USB device and a phone, computer, tablet, or smart device. Further, the firmware may provide for a plurality of such cohesive communications. In some embodiments, the firmware provides for a number of communications to the same number of device controller pairs, with each communication directed to a different device.

Figure 12:
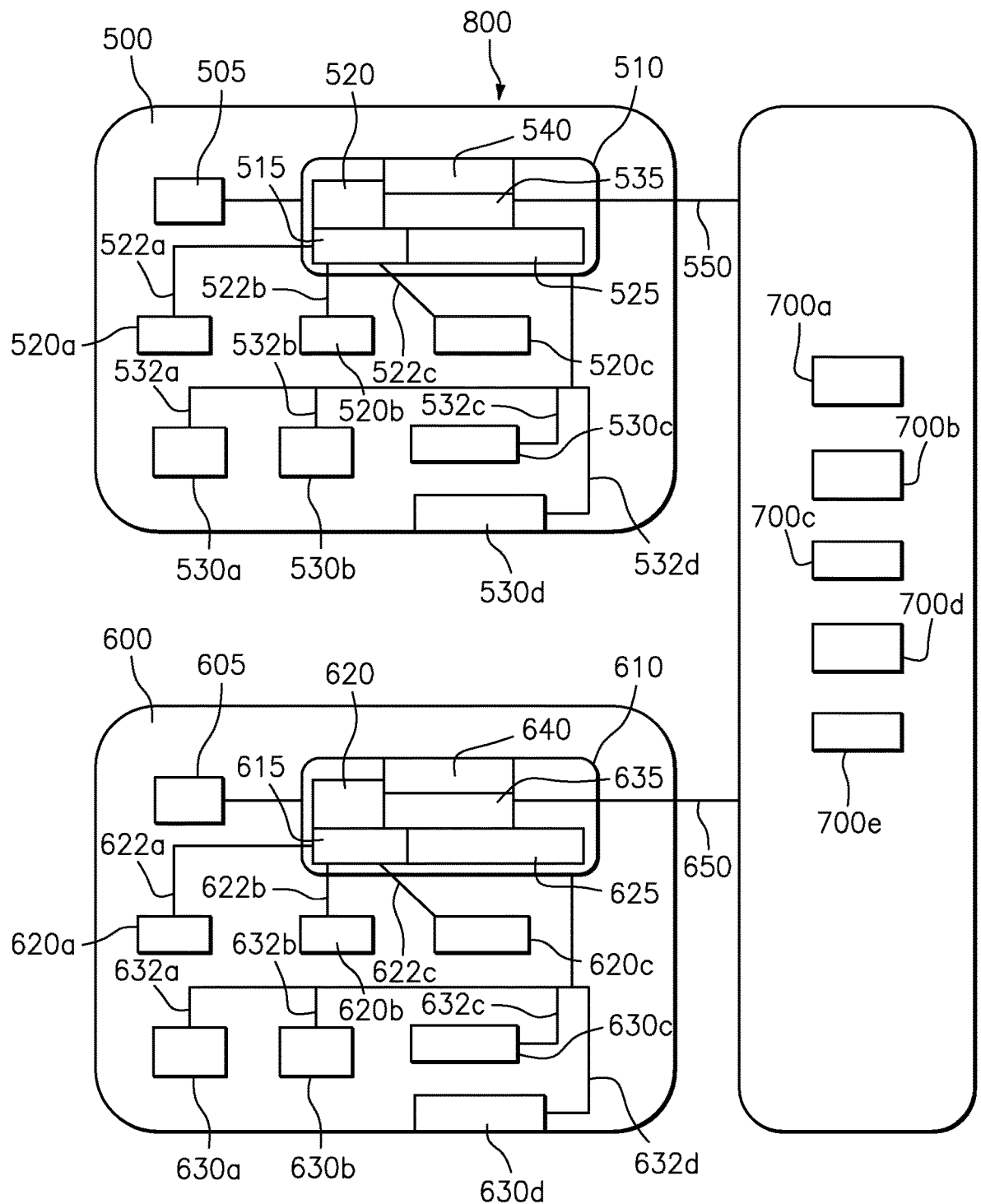
FIG. 12 is a schematic block diagram of \a system including multiple power switching devices wirelessly connectable to multiple devices and \multiple computing or "smart" devices.

An exemplary Internet of Things (IoT) system incorporating multiple power switching devices is shown in FIG. 8 in block diagram format. As seen in FIG. 12, system 800 encompasses two areas 500, 600, e.g., different rooms or spaces in a building. Area 500 includes a power switching device 510. Power switching device 510 may be, in some embodiments, any of the power switching devices previously described, e.g., devices 10, 110, 210, 310, or 410.

Switching device 510 is connectable to a facility power source 505. Switching device 510 has a power receptacle 515, which is in electrical communication with a power switch 520 that selectively delivers electrical power from power source 505 to power receptacle 515. Powered devices 520a (a lamp), 520b (a fan), 520c (an appliance) or any other powered device are electrically connected to the power receptacle 515 via wired paths 522a, 522b, 522c. Switching device 510 also contains one or more wireless receivers 525 configured to wirelessly connect and communicate with remote devices 530a (motion sensor), 530b (door lock), 530c (thermostat), 530d (remote control) or any other remote device via wireless paths 532a, 532b, 532c, 532d. Switching device 510 further includes one or more wireless transmitters and/or transceivers 535, which in the illustrated embodiment include both WiFi and Bluetooth radios. The transceivers 535 are in signal communication with the wireless receiver(s) 525. Switching device 510 also has a USB port 540 for a wired/cable connection.

Area 600 includes a power switching device 610. Switching device 610 is connectable to a facility power source 605. Switching device 610 has a power receptacle 615, which is in electrical communication with a power switch 620 that selectively delivers electrical power to power receptacle 615. Powered devices 620a (a lamp), 620b (a fan), 620c (an appliance) or any other powered device are electrically connected to the power receptacle 615 via wired paths 622a, 622b, 622c. Switching device 610 also contains one or more wireless receivers 625 configured to wirelessly connect and communicate with remote devices 630a (water valve), 630b (humidity sensor), 630c (thermostat), 630d (leak detector) or any other remote device via wireless paths 632a, 632b, 632c, 632d. Switching device 610 further includes one or more wireless transmitters and/or transceivers 635, which in the illustrated embodiment include both WiFi and Bluetooth radios. The transceivers 635 are in signal communication with the wireless receiver(s) 625. Switching device 610 also has a USB port 640 for a wired/cable connection.

Both switching device 510 and switching device 610 can wirelessly communicate with one or more computing systems and/or devices 700a (local computer), 700b (cloud storage), 700c (smart phone), 700d (cloud application), 700e (tablet) via communication paths 550, 650, which may be wired connections, wireless connections, or combinations thereof. The computing systems, power switches, and remote devices collectively form an Internet of Things (IoT).

The system 800 can be operated, controlled, monitored, and/or programmed from one or more of the computing systems 700a, 700b, 700c, 700d, 700e as described herein. In one example, lamp 520a can be controlled by the smart phone 700c. For example, a user can use the smart phone 700c to communicate with the switching device 510 via the transceiver 535 to instruct the power switch 520 to change from an open (off) position to a closed (on) position, or vice versa, thereby turning the light 520a on or off. In doing so, the switching device 510 enables control of the lamp 520a without the lamp being independently connectable to the IoT.

As another example, a user can program the system 400 such that, when the motion sensor 530a senses a person within area 500, the system 400 instructs the power switch 520 to change into the "on" position and turn the lamp 520a on. In addition, or alternatively, the thermostat 530c can be instructed to adjust the temperature in area 500 (or whichever area or location the thermostat 530c controls) to a desired setting. Yet further, the system 400 can also instruct the thermostat 630c in area 600 to adjust the temperature in area 600 (or whichever area or location the thermostat 630c controls). In this manner, the system 400 and/or user can monitor and control multiple devices without each device needing to be individually and separately connected to the network or the IoT. Those skilled in the art should understand that the above examples of operation are merely exemplary, and the invention contemplates various modes and methods of operation.

Though the embodiment of FIG. 12 shows two areas 500, 600 using two power switching devices 510, 610 (one in each area) with certain wireless and receptacle (plugged-in for power supply) devices, there are no limits on system size. The invention contemplates systems of any size with any number of power switch devices, wireless devices and/or receptacle devices.

The power switching device may additionally or alternatively include one or more of the features described in the related U.S. Patent applications described below, each of which is assigned to the assignee of the present invention and incorporated by reference in its entirety: U.S. patent application Ser. No. 14/245,829, filed Apr. 4, 2014, entitled "Wireless Aggregator," which claims the benefit of similarly titled U.S. Provisional Patent Application No. 61/809,079, filed Apr. 5, 2013; U.S. patent application Ser. No. 14/815, 761, entitled "Systems and Methods for Communication Between Devices and Remote Systems With a Power Cord," filed Jul. 31, 2015, which claims the benefit of U.S. Provisional Application No. 61/999,557, entitled "System Connecting Appliances to the Cloud with Power Cord," filed Jul. 31, 2014; U.S. patent application Ser. No. 14/823,732, entitled "Multifunction Pass-Through Wall Power Plug With Communication Relay and Related Method," filed Aug. 11, 2015, which claims the benefit of U.S. Provisional Patent Application No. 61/999,914, entitled "Pass-Through Wall Power Plug," filed Aug. 11, 2014, and U.S. patent application Ser. No. 29/491,496, entitled Wireless Transmission Device, filed May 21, 2014.

As may be recognized by those of ordinary skill in the pertinent art based on the teachings herein, numerous changes and modifications may be made to the above-described and other embodiments without departing from the spirit and/or scope of the invention. By way of example only, the disclosure contemplates, but is not limited to, embodiments having any one or more of the features (in any combination or combinations set forth in the above description. Accordingly, this detailed description of embodiments is to be taken in an illustrative as opposed to a limiting sense.

What is claimed is:

1. A power switch, comprising:
   a housing;
   a power connector configured to receive alternating current power, the power connector comprising a three-pronged plug adapted to be inserted into an electrical receptacle;
   a power receptacle comprising a female plug receptacle adapted to receive a male plug associated with a powered device;
   a switch configured to selectively place the power receptacle into electrical communication with the power connector;
   a communications module configured to bridge communications between a mobile device and a computing device, the communications module comprising a first radio and a second radio, the first radio configured to communicate with the computing device via a first wireless protocol, the second radio configured to communicate with the mobile device via a second wireless protocol that is different than the first wireless protocol;
an on-board memory configured to store aggregated usage data relating to one or more of the powered device or a remote device; and
a controller:
aggregating the usage data; and,
controlling the operation of at least one other device via one or more of the power receptacle, the first radio, or the second radio, based on the aggregated usage data.

2. The power switch as in claim 1, wherein the communications module is configured to enable one or more of direct remote monitoring or remote control of the powered device using one or more of Bluetooth, Bluetooth low energy, WIFI to local network, WIFI to cloud based applications, infrared, 802.11 frequency, ultrasound frequency, Zigbee™ Zigbee™ frequency, ISM Band radio location spectrum frequency, ISM Band 420 Mhz to 450 Mhz, ISM Band 902 Mhz to 928 Mhz, GSM Band radio frequency, GSM-450, or GSM-900.

3. The power switch as in claim 1, wherein the powered device comprise remotely stored data stored within on board memory, or accessed via WIFI and the communications bridge to applications that reside on local devices, desktop computers, applications on a local network, Bluetooth devices, paired devices, infrared controlled devices, 802.11 frequency controlled devices, ultrasound frequency controlled devices, Zigbee™ or Zigbee™ frequency controlled devices, ISM Band radio location spectrum frequency controlled devices, ISM Band 420 Mhz to 450 Mhz devices, ISM Band 902 Mhz to 928 Mhz devices, GSM Band radio frequency controlled devices, GSM-450 devices or and GSM-900 devices.

4. The power switch as in claim 1, further comprising control applications residing one or more of on board the switch, on desktop computers, on laptop computers, on tablet computers, on cell phones, on cloud based devices, on infrared controlled devices, on 802.11 frequency controlled devices, on ultrasound frequency controlled devices, on Zigbee™ or Zigbee™ frequency controlled devices, on ISM Band radio location spectrum frequency controlled devices, on ISM Band 420 Mhz to 450 Mhz devices, on ISM Band 902 Mhz to 928 Mhz devices, on GSM Band radio frequency controlled devices, on GSM-450 devices or on GSM-900 devices.

5. The power switch as in claim 1, further comprising programmable alarm state conditions and warnings for communicatively connected devices residing one or more of on board the switch, on desktop computers, on laptop computers, on tablet computers, on cell phones, on cloud based devices, on infrared controlled devices, on 802.11 frequency controlled devices, on ultrasound frequency controlled devices, on Zigbee™ or Zigbee™ frequency controlled devices, on ISM Band radio location spectrum frequency controlled devices, on ISM Band 420 MHz to 450 Mhz devices, on ISM Band 902 Mhz to 928 Mhz devices, on GSM Band radio frequency controlled devices, on GSM-450 devices, or on GSM-900 devices.

6. The power switch as in claim 1, further comprising firmware adapted to enable a plurality of cohesive communications interfacing through the switch from one or more of WIFI, Bluetooth or Bluetooth low energy communications output to one or more of a phone, a computer, a tablet, a smart device, an infrared controlled device, an 802.11 frequency controlled device, an ultrasound frequency controlled devices, a Zigbee™ or Zigbee™ frequency controlled devices, a device that operates with WIFI protocol but does not have access point privilege, an ISM Band radio location spectrum frequency controlled devices, an ISM Band 420 Mhz to 450 Mhz controlled device, an ISM Band 902 Mhz to 928 Mhz controlled device, a GSM Band radio frequency controlled device, a GSM-450 device, or a GSM-900 device.

7. The power switch as in claim 1, further comprising data storage and monitoring applications for the switch residing one or more of on board the switch, on desktop computers, on laptop computers, on tablet computers, on cell phones, on cloud based-devices, on infrared controlled devices, on 802.11 frequency controlled devices, on ultrasound frequency controlled devices, on Zigbee™ or Zigbee™ frequency controlled devices, on devices that operate with WIFI protocol but do not have access point privilege, on ISM Band radio location spectrum frequency controlled devices, on ISM Band 420 Mhz to 450 Mhz controlled devices, on ISM Band 902 Mhz to 928 Mhz controlled devices, on GSM Band radio frequency controlled devices, on GSM-450 devices, or on GSM-900 devices.

8. The power switch as in claim 1, wherein the communications module is configured to pair with the remote device, and wherein the switch further comprises on board applications configured to control the remote device, and wherein the remote device comprises one of Bluetooth or Bluetooth low energy devices, infrared controlled devices, 802.11 frequency controlled devices, ultrasound frequency controlled devices, Zigbee™ or Zigbee™ frequency controlled devices, devices that operate with WIFI protocol but do not have access point privilege, ISM Band radio location spectrum frequency controlled devices, ISM Band 420 Mhz to 450 Mhz controlled devices, ISM Band 902 Mhz to 928 Mhz controlled devices, GSM Band radio frequency controlled devices, GSM-450 devices, or GSM-900 devices.

9. The power switch as in claim 8, wherein the switch is configured to control the remote device via WIFI communication to one or more of a local network, a computer, a tablet, a cell phone, or a cloud based application.

10. The power switch as in claim 8, further comprising control applications for the switch, residing on one or more of on board the switch, on the remote device, or on one or more of a desktop computer, laptop computer, tabled computer, cell phone, or cloud-based device.

11. The power switch as in claim 8, further comprising programmable alarm state conditions and warnings for the remote device residing on one or more of on board the switch, on one or more of said plurality of devices, or on one or more of a desktop computer, laptop computer, tabled computer, cell phone, or cloud-based device.

12. The power switch as in claim 1, wherein the first wireless protocol comprises a Bluetooth protocol, and wherein the second wireless protocol comprises a WIFI protocol.

13. The power switch as in claim 1, further comprising a programmable, dimmable, tricolored LED night light.

14. The power switch as in claim 1, wherein the switch includes one or more of a standard 115V/15A, a NEMA5-15 style, a standard 115V/20A, a NEMA5-20 style, a standard phase/neutral/ground 110V wiring plug/receptacle, a standard 220V single phase plug/receptacle, a standard phase/neutral/ground 220V wiring, a standard phase/neutral/ground 127V wiring, a standard phase/neutral/ground 230V wiring, a standard phase/neutral/ground 240V wiring, or a relay or contactor that uses an SCR or Triac, for power output.

15. The power switch as in claim 1, wherein the switch includes one or more of an SCR, a Triac, a PWM controlled transformer, a flyback controlled transformer, or a flyback controlled inductor configured for dimming or motor speed control for either AC or DC power output.

16. The power switch as in claim 1, wherein the switch uses one or more of a step down transformer, a flyback controlled inductor, a half wave rectifier and capacitive voltage divider, or a half wave rectifier, to connect a load to AC power for one or more of AC or rectified DC power output.

17. The power switch as in claim 1, wherein the power switch includes one or more of a manual connect or disconnect switch.

18. The power switch as in claim 1, further comprising a power output, wherein the power switch includes a current monitor configured to measure power usage of a device connected to the power output of the power switch.

19. The power switch as in claim 1, further including a USB port configured to one or more of control, monitor, or transfer data to USB devices connected to the power switch.

20. The power switch of claim 1, wherein:
when the first radio is in communication with the computing device via the first protocol, the first radio is in communication with the computing device via an indirect path; and
when the second radio is in communication with the remote device via the second protocol, the second radio is in direct communication with the remote device.

21. The power switch of claim 1, wherein the housing has a substantially brick-like shape.

22. The power switch of claim 21, wherein when the three-prong plug is inserted into an outlet of the electrical receptacle, the longest dimension of the housing is oriented in a horizontal direction such that the housing fits with a vertical space corresponding to the outlet.

23. The power switch of claim 1, wherein:
the power connector extends through an opening defined by the housing; and
wherein when the three-pronged plug is inserted into the electrical receptacle, the housing is rotatable relative to the three-pronged plug.

24. A system comprising:
a computing device configured for wireless communication and connectable to one or more of a local network, internet, or cloud storage;
a powered device configured to operate using electrical power;
a remote device configured for wireless communication; and
a power switch comprising:
a housing;
a power connector configured to receive alternating current power, the power connector comprising a three-prong plug adapted to be inserted into an electrical receptacle;
a power receptacle comprising a female plug receptacle adapted to receive a male plug associated with the powered device;
a switch configured to selectively place the power receptacle into electrical communication with the power connector;
a communications module configured to bridge communications between the remote device and the computing device, the communications module comprising a first radio and a second radio, the first radio configured to communicate with the computing device via a first wireless protocol, the second radio configured to communicate with the remote device via a second wireless protocol that is different than the first wireless protocol;
an on-board memory configured to store aggregated usage data relating to one or more of the powered device or the remote device; and
a controller:
aggregating the usage data; and,
controlling the operation of at least one other device via one or more of the power receptacle, the first radio, or the second radio, based on the aggregated usage data.

25. A system as defined in claim 24, wherein the computing device comprises one or more of a desktop computer, a laptop computer, a tablet, a smart-phone, or a cloud-based computer.

26. A system as defined in claim 24, further comprising control applications for controlling operations of one or more of the power switch, powered device, or remote device, wherein the control applications reside in one or more of on-board memory of the power switch, the powered device, the remote device, the computing device, the local network, the internet, or the cloud storage.

27. A system as defined in claim 24, wherein the system is configured to monitor and store data relating to one or more of the power switch, the powered device, or the remote device, and wherein the stored data resides in one or more of on board memory of the power switch, the powered device, the remote device, the computing device, the local network, the internet, or the cloud storage.

28. A system as defined in claim 24, wherein the system is configured to identify and provide warnings for programmable alarm state conditions of one or more of the power switch, the powered device, or the remote device, and wherein the programs for said alarm state conditions reside in one or more of on board memory of the power switch, the powered device, the remote device, the computing device, the local network, the internet, or the cloud storage.

29. A system as defined in claim 24, wherein:
the first wireless protocol comprises a Bluetooth protocol; and
the second wireless protocol comprises a Wifi protocol.

30. A system as defined in claim 24, wherein the power switch further comprises:
a current monitor configured to measure power usage of the powered device.

31. A system as defined in claim 24, wherein:
the power switch further comprises a USB port; and
the remote device includes a USB device configured to be plugged into the USB port.

32. The system of claim 24, wherein the housing defines an opening through which the power connector extends, and wherein the housing is rotatable relative to the three-prong plug when the three-prong plug is inserted into the electrical receptacle.

* * * * *